(12) United States Patent
Zhang et al.

(10) Patent No.: US 11,255,873 B2
(45) Date of Patent: Feb. 22, 2022

(54) INCREASED SENSITIVITY Z-AXIS ACCELEROMETER

(71) Applicant: Analog Devices, Inc., Norwood, MA (US)

(72) Inventors: Xin Zhang, Acton, MA (US); Gaurav Vohra, Sudbury, MA (US); Michael Judy, Ipswich, MA (US)

(73) Assignee: Analog Devices, Inc., Wilmington, MA (US)

( * ) Notice: Subject to any disclaimer, the term of this patent is extended or adjusted under 35 U.S.C. 154(b) by 64 days.

(21) Appl. No.: 16/129,755

(22) Filed: Sep. 12, 2018

(65) Prior Publication Data

US 2020/0081029 A1 Mar. 12, 2020

(51) Int. Cl.
*G01P 15/125* (2006.01)
*G01P 15/08* (2006.01)

(52) U.S. Cl.
CPC .... *G01P 15/125* (2013.01); *G01P 2015/0831* (2013.01); *G01P 2015/0837* (2013.01)

(58) Field of Classification Search
CPC .......... G01P 15/125; G01P 2015/0837; G01P 2015/0831; G01P 15/131; G01P 2015/0822; G01P 2015/0828
USPC ............. 73/514.29, 514.01, 514.16, 514.18, 73/514.21, 514.22, 514.23, 514.24, 73/514.32–514.34, 514.37, 514.38
See application file for complete search history.

(56) References Cited

U.S. PATENT DOCUMENTS

| | | |
|---|---|---|
| 4,002,077 A | 1/1977 | Taplin |
| 4,454,756 A | 6/1984 | Sharp et al. |
| 5,488,864 A | 2/1996 | Stephan |
| 6,038,924 A | 3/2000 | Lee et al. |
| 6,230,566 B1 | 5/2001 | Lee et al. |
| 6,845,670 B1 | 1/2005 | McNeil et al. |
| 7,121,141 B2 | 10/2006 | McNeil |
| 7,140,250 B2 | 11/2006 | Leonardson et al. |
| 7,210,352 B2 | 5/2007 | Foster et al. |
| 8,304,274 B2 | 11/2012 | Zuniga-Ortiz et al. |
| 8,539,836 B2 | 9/2013 | McNeil |
| 8,555,719 B2 | 10/2013 | McNeil et al. |

(Continued)

FOREIGN PATENT DOCUMENTS

| | | |
|---|---|---|
| CN | 102466736 B | 6/2014 |
| EP | 1 257 783 A1 | 11/2002 |

(Continued)

OTHER PUBLICATIONS

International Search Report and Written Opinion dated Dec. 8, 2019 in connection with International Application No. PCT/US2019/049624.

(Continued)

*Primary Examiner* — Robert R Raevis
(74) *Attorney, Agent, or Firm* — Wolf, Greenfield & Sacks, P.C.

(57) ABSTRACT

Z-axis teeter-totter accelerometers with embedded movable structures are disclosed. The teeter-totter accelerometer may include an embedded mass which pivots or translates out-of-plane from the teeter-totter beam. The pivoting or translating embedded mass may be positioned to increase the sensitivity of the z-axis accelerometer by providing greater z-axis displacement than the teeter-totter beam itself exhibits.

19 Claims, 12 Drawing Sheets

(56) References Cited

U.S. PATENT DOCUMENTS

| | | |
|---|---|---|
| 8,671,756 B2 | 3/2014 | Comi et al. |
| 8,689,632 B2 | 4/2014 | Jia et al. |
| 8,701,490 B2 | 4/2014 | Jiang et al. |
| 8,978,475 B2 | 3/2015 | Acar |
| 9,218,065 B2 | 12/2015 | Mahameed et al. |
| 9,297,825 B2 | 3/2016 | Zhang et al. |
| 9,360,496 B2 | 6/2016 | Naumann |
| 9,377,482 B2 | 6/2016 | Comi et al. |
| 9,389,077 B2 | 7/2016 | Comi et al. |
| 9,470,709 B2 | 10/2016 | Zhang |
| 10,816,569 B2 | 10/2020 | Zhang et al. |
| 2002/0092352 A1 | 7/2002 | Foote |
| 2003/0036214 A1 | 2/2003 | Eskridge |
| 2007/0034007 A1 | 2/2007 | Acar |
| 2007/0090475 A1 | 4/2007 | Karnick et al. |
| 2011/0313703 A1 | 12/2011 | Petillon et al. |
| 2012/0125104 A1* | 5/2012 | Qiu .................. G01P 21/00 73/514.32 |
| 2012/0204642 A1 | 8/2012 | McNeil et al. |
| 2013/0214367 A1 | 8/2013 | Van der Heide et al. |
| 2013/0333471 A1 | 12/2013 | Chien |
| 2014/0217929 A1 | 8/2014 | Lin et al. |
| 2015/0177272 A1 | 6/2015 | Clark |
| 2015/0268268 A1 | 9/2015 | Liu et al. |
| 2015/0309069 A1 | 10/2015 | Boillot et al. |
| 2016/0097791 A1 | 4/2016 | Zhang |
| 2016/0130133 A1* | 5/2016 | Boillot .................. B81B 3/0048 73/504.12 |
| 2016/0377648 A1 | 12/2016 | Zhang |
| 2017/0023606 A1 | 1/2017 | Naumann |
| 2017/0108529 A1 | 4/2017 | Zhang et al. |
| 2017/0328931 A1 | 11/2017 | Zhang et al. |
| 2020/0081028 A1 | 3/2020 | Zhang et al. |

FOREIGN PATENT DOCUMENTS

| | | |
|---|---|---|
| EP | 1 717 669 A1 | 11/2006 |
| EP | 2 284 488 A1 | 2/2011 |
| JP | 2013-527920 A | 7/2013 |
| JP | 2014-029325 A | 2/2014 |
| TW | I488432 B | 6/2015 |
| TW | I570054 B | 2/2017 |
| WO | WO 01/051890 A1 | 7/2001 |
| WO | WO 2010/019278 A1 | 2/2010 |
| WO | WO 2011/124576 A1 | 10/2011 |
| WO | WO 2011/148137 A1 | 12/2011 |
| WO | WO 2013/030798 A1 | 3/2013 |
| WO | WO 2016/108770 A1 | 7/2016 |
| WO | WO 2017/070015 A1 | 4/2017 |

OTHER PUBLICATIONS

International Search Report and Written Opinion dated Dec. 31, 2019 in connection with International Application No. PCT/US2019/050587.

Shi et al., Asymmetric Seesaw Structure of Microelectromechanical Systems Accelerometer for Sensing Out-off-Plane Acceleration. ScienceDirect. Nov. 1, 2017;267:01-22.

Amini_et_al_Micro-Gravity Capacitive Silicon-On-Insulator Accelerometers. J. Micromech. Microeng. Georgia Institute of Technology. Sep. 23, 2005; 15:2113-2120.

International Preliminary Report on Patentability dated Mar. 18, 2021 in connection with International Application No. PCT/US2019/049624.

International Preliminary Report on Patentability dated Mar. 25, 2021 in connection with International Application No. PCT/US2019/050587.

* cited by examiner

INCREASED SENSITIVITY Z-AXIS ACCELEROMETER

FIELD OF THE DISCLOSURE

The present application relates to microelectromechanical systems (MEMS) z-axis accelerometers.

BACKGROUND

A z-axis accelerometer may include a "teeter-totter" beam which pivots in response to acceleration along the z-axis. The displacement amplitude of the beam may decrease at higher frequencies of acceleration.

SUMMARY OF THE DISCLOSURE

Z-axis teeter-totter accelerometers with embedded movable structures are disclosed. The teeter-totter accelerometer may include an embedded mass which pivots or translates out-of-plane from the teeter-totter beam. The pivoting or translating embedded mass may be positioned to increase the sensitivity of the z-axis accelerometer by providing greater z-axis displacement than the teeter-totter beam itself exhibits.

According to aspects of the present application, there is a MEMS z-axis teeter-totter accelerometer, comprising a substrate, an anchor, a beam connected to the substrate by the anchor and configured to pivot about a first axis. The first axis is parallel to the substrate. The beam is asymmetric relative to the first axis. The MEMS z-axis teeter-totter accelerometer comprises a proof mass coupled to the beam and configured to pivot relative to the beam, about a second axis different than the first axis.

According to aspects of the present application, there is a method of operating a MEMS z-axis accelerometer The accelerometer comprises a substrate, an anchor, a beam connected to the substrate by the anchor, and a proof mass coupled to the beam. The method comprises sensing an indication of a position of the beam relative to the substrate using at least one sense capacitance, and outputting a signal indicative of the at least one sense capacitance. The beam is configured to pivot about a first axis and the first axis is parallel to the substrate. The proof mass is configured to pivot relative to the beam about a second axis other than the first axis and parallel to the substrate.

According to aspects of the present application, there is a MEMS z-axis accelerometer, comprising a substrate, an anchor, a beam connected to the substrate by the anchor. The beam is configured to pivot about a first axis and the first axis is parallel to the substrate. The MEMS z-axis accelerometer comprises a proof mass embedded in the beam. The proof mass is configured to translate vertically out-of-plane relative to a pivoting plane of the beam.

BRIEF DESCRIPTION OF DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

DETAILED DESCRIPTION

Figure 1A:
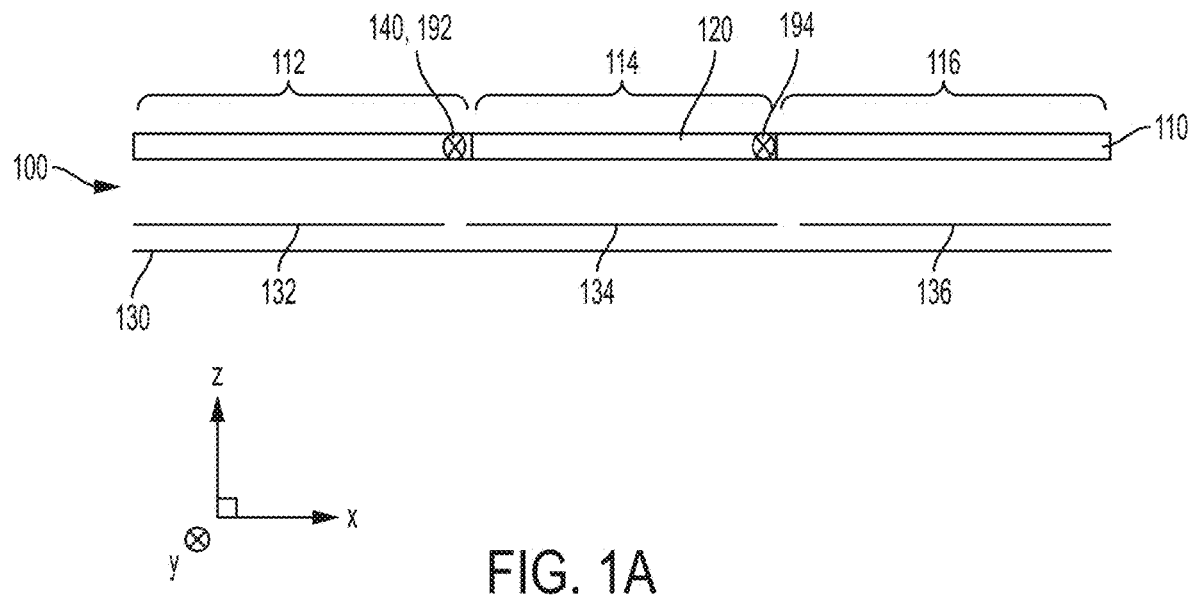
FIG. 1A is a side view of one embodiment of a z-axis accelerometer having a pivoting proof mass.

Aspects of the present application relate to a MEMS z-axis accelerometer having a pivoting beam with a proof mass configured to move relative to the beam. In various embodiments, the proof mass may be configured to pivot out of a plane of the beam, configured to translate out of plane of the beam, or in some embodiments, configured to both pivot and translate out of plane of the beam. The proof mass coupled to the beam may be configured to move with a greater amplitude relative to the substrate than the beam in response to an acceleration in the z direction, at least for a target operating frequency of the accelerometer. The movement of the proof mass relative to the beam may result in increased sensitivity of the accelerometer compared to if no proof mass was present. In some embodiments, a frequency range in which increased sensitivity is achieved may include 2 kHz to 16 kHz. In various embodiments, an operating frequency may be 11.6 kHz, 12.1 kHz or 13.7 kHz, although other frequencies are possible and the various aspects described herein are not limited to these particular frequencies.

The inventors have further recognized that the sensitivity of a pivoting-beam (or "teeter-totter") type z-axis accelerometer may be increased using a proof mass configured to move relative to a pivoting plane of the beam. A z-axis teeter-totter accelerometer may include a substrate, at least one anchor, and beam coupled to the at least one anchor and configured to pivot about a first axis parallel to the substrate. However, the displacement amplitude of the beam may decrease with increased frequency of the acceleration applied to the accelerometer, for example decreasing as a square of the frequency of the applied acceleration. Thus, the sensitivity of the accelerometer may decrease at higher frequencies of operation, and accordingly at some point may be too insensitive to certain higher frequencies to be useful. The inventors have recognized a means of increasing the sensitivity of a MEMS z-axis teeter-totter accelerometer, even at higher frequencies. In some embodiments, the means may be a proof mass coupled to the beam and configured to move relative to the beam. The proof mass coupled to the beam may have a different stiffness to displacement due to an acceleration in the z direction than a stiffness of the beam to displacement due to the acceleration in the z direction. Some embodiments may include two or more proof masses movable relative to the beam.

According to an aspect of the present application, a teeter-totter accelerometer comprises a beam configured to pivot about a first axis and a proof mass coupled to the beam and configured to pivot relative to the beam about a second axis different than the first axis. The beam may be supported above, or suspended above, a substrate, and the first and second axes may be parallel to the substrate. The second axis may be parallel to the first axis in some embodiments, or perpendicular to the first axis in other embodiments. In some embodiments, the second axis may be parallel to a plane of the beam. The pivoting motion of the proof mass relative to the beam may result in the accelerometer demonstrating increased sensitivity compared to an accelerometer lacking the pivoting proof mass, because the proof mass may provide greater displacement of the accelerometer in response to an input acceleration. second axis According to an aspect of the present application, a teeter-totter accelerometer comprises a beam configured to pivot about a first axis and a proof mass coupled to the beam and configured to translate out-of-plane from the beam. That is, in some embodiments the proof mass may be configured to not pivot about the first axis. The inventors have recognized that a proof mass coupled to the beam of a teeter-totter accelerometer and configured to translate out of plane relative to a pivoting plane of the beam may increase the sensitivity of the accelerometer by providing greater displacement in response to an input acceleration. In some embodiments, the out of plane translation may be vertical relative to the plane.

Aspects of the present application may provide a beam configured in different arrangements. In some embodiments, the beam may include a first portion, and a second portion. In some embodiments, the beam further includes a third portion. The first portion may be adjacent to the second portion and the second portion may be between the first portion and the third portion. The first portion and the second portion of the beam may be separated by the first axis. In embodiments where the beam includes a first portion and a second portion, the second portion may have a greater mass than the first portion of the beam. In embodiments where the beam includes a first, second, and third portions, the second and third portions may have a greater combined mass than the first portion of the beam.

According to aspects of the present application, a proof mass may assume various positions relative to the beam. In various embodiments, the proof mass may be coupled to any of the first portion of the beam, to the second portion of the beam, or the third portion of the beam. In some embodiments, the proof mass is embedded in one or more portions of the beam. In some embodiments, the proof mass is partially or completely surrounded by the beam. In some embodiments, the proof mass may not be embedded in a portion of the beam, for example, the proof mass may be coupled to an outside edge of the beam. In some embodiments, the beam may be arranged in a portion distal the first axis, which may increase the sensitivity of the accelerometer.

Aspects of the present application provide various orientations with which the proof mass may be coupled to the beam. In some embodiments, the proof mass includes a first side proximate the first axis and a second side distal the first axis. In various embodiments, the first side may be coupled to the beam, the second side may be coupled to the beam, or, in some embodiments, both the first side and the second side of the proof mass may be coupled to the beam.

According to an aspect of the present application, the proof mass may be coupled to the beam by various structures. In some embodiments, the proof mass may be coupled to the beam by at least one spring or tether. The at least one spring may be at least one torsional spring. The at least one spring may be at least one bending spring. In some embodiments, the springs include both torsional and bending springs.

According to aspects of the present application, an accelerometer may include structures other than the beam and the proof mass. For example, sense, drive, and/or self-test electrodes may be provided. In some embodiments, signal electrodes may be included, which may be drive and/or sense electrodes. In some embodiments, electrodes are provided on the substrate, such as signal electrodes. In some embodiments, electrodes are provided on the beam. Alternatively, or in addition, the beam itself may form one or more electrodes. Electrodes may be formed by, or disposed on, any of the first, second and third portions of the beam. Electrodes may be disposed on the substrate under one or more portions of the beam. In some embodiments there are two or more electrodes, each of which is associated with a different sense area of the beam. A sense area may comprise an area of the beam facing an electrode. A sense area may include a portion of the beam including a proof mass, a portion of the beam not including a proof mass, a proof mass, or other structures of the beam. In some embodiments, drive electrodes may be used to provide a driving signal to the beam. The driving signal may be a signal provided to the beam by a first drive electrode and a second drive electrode, which may be disposed on the substrate underlying the beam. The drive signal may be a differential drive signal in at least some embodiments.

The beam and/or the electrodes may sense the displacement of the beam relative to the substrate The electrodes and the beam may form one or more sense capacitors, which each provide a changing sense capacitance, between the electrodes and the beam, in response to movement of the beam. The one or more sense capacitors may provide a differential output, or pseudo-differential output. In some embodiments, a differential output may be provided by the beam. The output of the sense capacitors may be used to determine the acceleration of the accelerometer. Sense capacitors may provide a higher sensitivity signal in a configuration with a proof mass configured to move relative to the beam than in a configuration without the proof mass. The proof mass may cause the signal from the sense capacitors to not be fully differential relative to each other.

Aspects of the present application may provide a beam configured to provide two or more substantially equal sense areas of the beam. In some embodiments, there may be a first sense area including a portion of the beam and a second sense area including a proof mass. In these embodiments, it may be advantageous to configure the beam such that the first and second sense areas are substantially equal.

According to aspects of the present application, the beam may include one or more structures to provide two or more substantially equal sense areas. In some embodiments, the beam may include at least one first opening in the beam. The first opening may be adjacent the proof mass. In some embodiments, the at least one spring may be adjacent at the least one first opening in the beam. A portion of the beam across the first axis from the at least one spring may include at least one stub configured to occupy substantially the same area of the beam as the at least one spring. The portion of the beam across the first axis from the at least one first opening may include at least one second opening configured to occupy substantially the same area of the beam as the at least one first opening. The at least one spring, at least one stub, at least one first opening, and at least one second opening may be configured such that there are two substantially equal sensing areas In some embodiments, the first and second openings may provide stress relief for the beam.

The aspects and embodiments described above, as well as additional aspects and embodiments, are described further below. These aspects and/or embodiments may be used individually, all together, or in any combination of two or more, as the application is not limited in this respect.

FIG. 1A is a schematic diagram illustrating a MEMS z-axis accelerometer according to one exemplary embodiment of the present application. Accelerometer 100 may be a teeter-totter accelerometer, which may be alternatively referred to herein as a pivoting beam accelerometer. The accelerometer 100 may be configured to sense acceleration in the z direction. Accelerometer 100 may comprise a beam 110, a proof mass 120, a substrate 130, and at least one anchor 140.

Figure 1B:
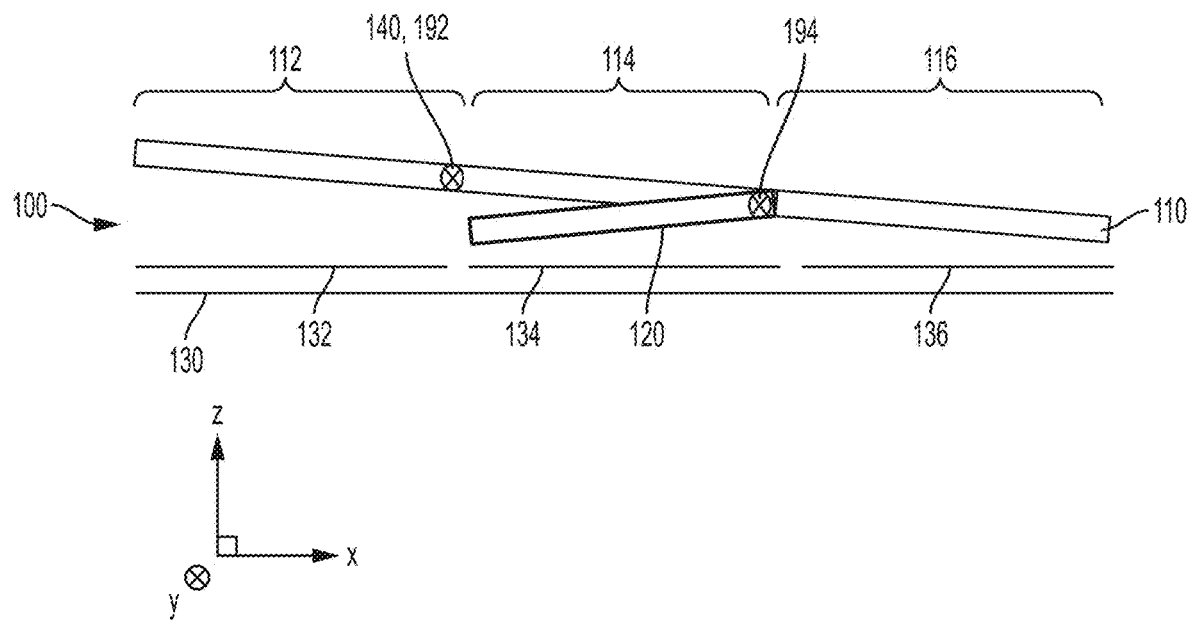
FIG. 1B is a side view of one embodiment of a z-axis accelerometer having a pivoting proof mass.

In some embodiments, the beam 110 may move relative to the substrate 130 in response to an acceleration in the z direction. FIG. 1A shows an illustration of an accelerometer 100 according to an embodiment of the present application when an acceleration of 0 g in the z direction is applied. FIG. 1B shows an illustration of accelerometer 100 according to an embodiment of the present application when an acceleration with a magnitude greater than 0 g in the z direction is applied.

In some embodiments, the beam 100 may pivot about a first axis 192. The beam 110 may be arranged in a pivoting plane. The first axis 192 may be aligned with an anchor 140 such that the beam pivots about the anchor. In some embodiments, the first axis 192 is in-plane with respect to the beam 110. In some embodiments the first axis 192 is substantially parallel with respect to the substrate.

According to aspects of the present application, the beam 110 may be arranged in, or comprise, one or more portion. In some embodiments, the beam 110 may include a first portion 112, a second portion 114 adjacent the first portion, and a third portion 116 adjacent the second portion. The portions may be substantially rectangular in some embodiments. The first portion 112 may be separated from the second portion 114 by the first axis 192 about which the beam pivots. In some embodiments, the first portion 112 and second portion 114 may be separated by an axis other than the first axis 192. In some embodiments, the second portion 114 may be separated from the third portion 116 in a substantially similar manner.

The beam may be arranged such that there is a mass imbalance of two sides of the beam 110 separated by the first axis 192. The second portion 114 and the third portion 116 may have a combined greater mass than the first portion 112, a lower combined mass than the first portion, or in some embodiments, a substantially equal combined mass as the first portion. In an embodiment where the first portion 112 is separated from the second portion 114 by the first axis 192, the second portion 114 and the third portion 116 may together form a portion of the beam. In a configuration where the second portion 114 and the third portion 116 have a combined greater mass than the first portion 112, the accelerometer 100 may be a teeter-totter accelerometer. In at least one aspect, the beam 110 may be asymmetric relative to an axis. Said axis may be the first axis 192. In some embodiments, the beam 110 may be asymmetric with respect to shape in the x-y plane. In some embodiments the beam 110 may be asymmetric with respect to mass distribution. The beam 110 may further include openings or other structures arranged to configure the mass of the beam and/or the mass of different portions of the beam. The mass of the first portion 112, second portion 114, and third portion 116 may be configured such that the beam 110 pivots in response to an acceleration in the z direction.

Aspects of the present application may also provide a proof mass 120. The proof mass 120 may be configured to increase the sensitivity of an accelerometer 100 to acceleration in the z-direction. In some embodiments, the proof mass 120 may move with respect to the beam 110. In some embodiments, the proof mass moves out of plane with respect to the beam 110. The proof mass may pivot and/or translate relative to the beam. In the illustrative embodiment of FIGS. 1B and 1C, the proof mass pivots with respect to the beam about a second axis 194 which is substantially parallel to the first axis 192.

In some embodiments, the proof mass 120 may pivot about a second axis 194. The second axis 194 may be different than the first axis 192. The proof mass 120 may be configured to pivot about said second axis 194 in response to an acceleration in the z direction. In the illustrative embodiment of FIG. 1C, the proof mass 120 may pivot about a second axis 194 substantially parallel to the first axis 192 and substantially parallel to the substrate 130. In the illustrative embodiment, the second axis 194 is spaced from the first axis 192 along a direction perpendicular to the first axis 192. The application is not limited in this respect, and the second axis 194 may be configured in any other arrangement relative to the first axis 192. For example, the first axis 192 may be arranged substantially perpendicular to the first axis 192 or may be arranged at an angle which is not substantially parallel or perpendicular relative to the first axis 192. The first axis 192 may be arranged in a plane of the beam 110, or may be arranged out of plane of the beam.

In some embodiments, the proof mass may be disposed in various arrangements relative to the beam. In the illustrative embodiment of FIG. 1C, the proof mass 120 is arranged in the second portion 114 of the beam 110. The application is not limited in this respect, and the beam may be disposed in other arrangements. For example, in some embodiments, the proof mass 120 is arranged in the first portion 112 of the beam 110 or in the third portion 116 of the beam. In some embodiments, the proof mass 120 may be at least partially embedded in one or more portions of the beam 110. In the illustrative embodiment of FIG. 1C, the proof mass 120 may be arranged such that it is embedded in the beam 110, in the second portion 114. In some embodiments, the proof mass 120 may be partially or completely surrounded by the beam 110. In other embodiments, the proof mass 120 may be coupled to an outer edge of the beam 110 such that is not embedded in the beam, for example, as shown in the illustrative embodiment of FIG. 4.

According to aspects of the current application, the proof mass 120 be coupled to the beam in various orientations. The proof mass 120 may comprise a first side 122 and a second side 124. The first side 122 and second side 124 may be arranged substantially parallel to the first axis 192. The application is not limited in this respect, and the first side 122 and second side 124 may be arranged substantially perpendicular to the first axis 192, or may be arranged at an angle which is not substantially parallel or perpendicular relative to the first axis 192. The first side 122 may be proximate the first axis 192, and the second side 124 may be distal the first axis 192. In the illustrative embodiment of FIG. 1C, the second side 124 of the proof mass 120 is coupled to the beam 110. The application is not limited in this respect, and any side of the proof mass 120 may be coupled to the beam 110. In some embodiments, the first side 122 of the proof mass 120 may be coupled to the beam 120. In other embodiments, a side of the proof mass 120 other than the first side 122 or second side 124 may be coupled to the beam 110. For example, in a configuration where the proof mass is configured substantially as a rectangular prism, a side of the proof mass 120 which is substantially perpendicular to both the first side 122 and the second side 124 may be coupled to the beam 110.

Figure 1C:
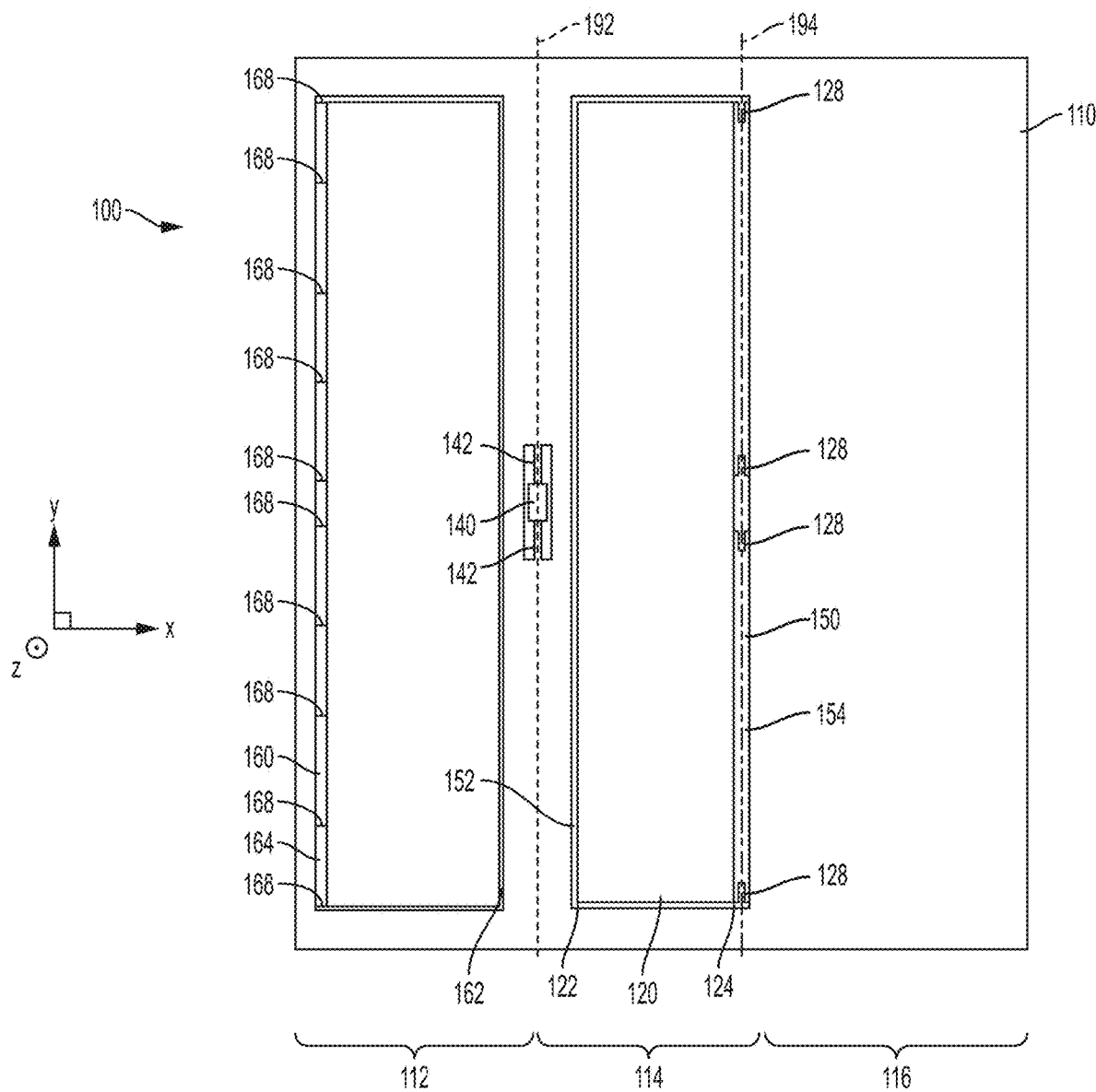
FIG. 1C is a top view of one embodiment of a z-axis accelerometer having a pivoting proof mass.

The proof mass 120 may be coupled to the beam 110 by at least one spring of suitable type, shape, dimension, and orientation. FIG. 1C shows the proof mass 120 coupled to the beam 110 by springs 128. The springs may be arranged along a second axis 194 about which the proof mass 120 pivots with respect to the beam 110. In the illustrative embodiment of FIG. 1C, the proof mass 120 is coupled to the beam 110 by four torsional springs. The application is not limited with respect to the number of springs coupled between the proof mass 120 and beam 110, and any suitable number of springs may be used. A torsional spring may be structure which allows pivoting about a pivot axis with some stiffness, although torsional springs of the present application are not limited in this respect. In some embodiments, the beam 110 and/or proof mass 120 may be considered stiff and/or rigid relative to a torsional spring. In some embodiments, the proof mass is coupled to the beam by at least one bending spring. A bending spring may be any structure which allows translation from a point with some stiffness, although the bending springs of the present application are not limited in this regard. In some embodiments, the beam 110 and/or proof mass 120 may be considered stiff and/or rigid relative to a bending spring. Springs 128 may be configured of different lengths, cross-sectional areas, and material properties to achieve a desired torsional and/or bending rigidity and/or stiffness.

Aspects of the present application may also provide a proof mass of various shapes. In the embodiment illustrative in FIG. 1C, the proof mass 120 is shaped substantially as a rectangular prism. However, the application is not limited in this respect, and the proof mass 120 may have another shape, for example, a triangular prism or a cylinder among other possibilities.

According to aspects of the present application there may be provided accelerometers which include two or more proof masses. When two or more proof masses are provided, they each may be configured substantially similarly to the proof mass 120 in at least one aspect. When two or more proof masses are provided, they may be arranged symmetrically with respect to the beam. For example, the two or more proof masses may be configured symmetrically reflected and/or translated across an axis which is arranged substantially perpendicular to the first axis. In some embodiments, the two or more proof masses may be arranged symmetrically reflected and/or translated across the first axis In some embodiments, the beam 110 may be arranged such that there is a substantially equal sense area for each portion of the beam. The beam may include various components on a portion of the beam 110 distal the proof mass 120 and a portion of the beam proximate the proof mass to configure a substantially equal sense area of said portions.

The beam 110 may include at least one first opening 150. The first opening may be adjacent the proof mass 120. The first opening 150 may be configured such that there is a gap between the proof mass 120 and the beam 110, which may allow the proof mass to move freely relative to the beam. In the illustrative embodiment of FIG. 1C, there is a first opening 150 adjacent the proof mass 120 and the beam 110. The first opening 150 may surround the proof mass 120 and the first opening may be surrounded by the beam 110.

According to aspects of the present application, the first opening 150 may include one or more sides configured in various arrangements. The first opening 150 may include a first side 152 and a second side 154. The first opening 150 may include one or more sides other than the first and second sides.

The sides of the first opening 150 may be arranged in different sizes. In the illustrative embodiment of FIG. 1C, the second side 154 of the first opening 150 is wider than the first side 152 of the first opening. In some embodiments, the first side 152 may be wider than the second side 154, or may be substantially equal in width to the second side.

The sides of the first opening 150 may be arranged at different angles relative to the beam. The first side 152 and second side 154 may be arranged substantially parallel to the first axis 192. The application is not limited in this respect, and the first side 152 and second side 154 may be arranged substantially perpendicular to the first axis 192, or may be arranged at an angle which is not substantially parallel or perpendicular relative to the first axis 192.

The sides of the first opening 150 may be arranged at different positions relative to the beam. In some embodiments, the first side 152 may be proximate the first axis 192 and the second side 154 may be distal the first axis 192. In other embodiments, the first side 152 may be distal the first axis 192 and the second side 154 may be proximate the first axis 192.

The first opening 150 may be arranged in various configurations relative to the proof mass 120 and/or the springs 128. In some embodiments, a wider side of the first opening 150 may be a side adjacent the side of the proof mass 120 which is coupled to the beam 110. In some embodiments, a wider side of the first opening 150 may be adjacent a side of the proof mass 120 where a spring is arranged. In some embodiments, a spring 128 may be arranged in a wider side of the first opening 150. In the illustrative embodiment of FIG. 1C, the second side 154 is wider than the first side, and the second side is adjacent the second side 124 of the proof mass 120. In the embodiment shown the second side 124 is coupled by the torsional springs 128 to the beam 110, and the springs 128 are disposed in the second side 154 of the first opening.

In some embodiments, one or more structures may be arranged on a portion of the beam 110 across the first axis 192 from the proof mass 120. Structures may be arranged such that each of a plurality of electrodes associated with the beam is coupled to a substantially equal sense area. In a configuration where the accelerometer has two electrodes, the structures may be configured such that two portions of the beam 110 have a substantially equal sensing area. In the illustrative embodiment of FIG. 1C, the proof mass 120 and the first opening 150 are arranged in the second portion 114 of the beam. In the illustrative embodiment, there is a second opening 160 arranged in the first portion 112 of the beam 110, which is across the first axis 192 from the first opening.

In some embodiments, the beam 110 may include at least one second opening 160. The second opening 160 may be arranged such that at distances equal from the first axis 192, or a different axis, in two portions of the beam 110, there is a substantially equal sense area of the beam.

According to aspects of the present application, the second opening 160 may include one or more sides configured in various arrangements. The second opening 160 may include a first side 162 and a second side 164. The second opening 160 may include one or more sides other than the first and second sides.

The sides of the second opening 160 may be arranged in different sizes. In the illustrative embodiment, the second side 164 of the first opening 160 is wider than the first side 162 of the first opening. In some embodiments, the first side 162 may be wider than the second side 164, or may be substantially equal in width to the second side.

The sides of the second opening 160 may be arranged at different angles relative to the beam. The first side 162 and second side 164 may be arranged substantially parallel to the first axis 192. The application is not limited in this respect, and the first side 162 and second side 164 may be arranged substantially perpendicular to the first axis 192, or may be arranged at an angle which is not substantially parallel or perpendicular relative to the first axis 192.

The sides of the second opening 160 may be arranged at different positions relative to the beam. In some embodiments, the first side 162 may be proximate the first axis 192 and the second side 164 may be distal the first axis 192. In other embodiments, the first side 162 may be distal the first axis 192 and the second side 154 may be proximate the first axis 192.

The second opening 160 and first opening 150 may be at least partially symmetric in at least one respect. The second opening 160 and the first opening 150 may be at least partially symmetric in the respect that they may be at least partially reflected and/or translated across the first axis 192. The first side 152 of the first opening and the first side 162 of the second opening may be equidistant to the first axis 192 and/or may be of substantially equal width. The second side 154 of the first opening 150 and the second side 164 of the second opening 160 may be equidistant to the first axis 192 and/or may be of substantially equal width. The first opening 150 and second opening 160 may occupy substantially equal area in the x-y plane.

The second opening 160 may include at least one stub 168. Stubs 168 may be arranged across the opening 160 and may be disposed in the first side 162, the second side 164 or another side. A portion of the stubs 168 disposed in a wider side of the second opening 160 may be configured such that the springs 128 and the portion of the stubs occupy a substantially equal area in the x-y plane. In some embodiments, the stubs 168 may provide structural support the beam 110.

While FIG. 1C shows stubs disposed only in the second side 164 of the opening 160, it should be understood that aspects of the present application are not limited in this respect. Stubs may be disposed in any side of the opening, such as sides between the first side and second side or in the first side as shown in FIG. 8C (discussed below). The stubs may be disposed in all or most sides of a second opening. According to aspects of the present application, the stubs may be configured to be sufficiently rigid or in sufficient number such that the a portion of a beam surrounded by a second opening does not move significantly with respect to the beam, even in a case where stubs are only located on a single side of the opening, such as in FIG. 1C.

The accelerometer 100 according to the present application may include a substrate 130. In the illustrative embodiment of FIGS. 1A and 1B, the substrate 130 is arranged in the x-y plane. The beam may be connected to the substrate by an anchor, and the beam may be arranged above the substrate. The beam may be supported above or suspended above the substrate. In some embodiments, suspension or support of the beam may be accomplished by various structures arranged on the substrate.

In some embodiments, the substrate 130 may include other structures. In some embodiments, the substrate 130 may include one or more sense electrodes, drive electrodes, and/or self-test electrodes. In the illustrative embodiment of FIGS. 1A and 1B, the accelerometer includes a first electrode 132, a second electrode 134, and self-test electrode 136. The first and second electrodes 132 and 134 may comprise drive and/or sense electrodes. In the illustrative embodiment, the electrodes are disposed on the substrate 130. In the illustrative embodiment each electrode is coupled to a portion of the beam 110. However, the present application is not limited in this respect, and electrodes may be configured in other arrangements, for example, on the beam 110, or arranged on different substrate.

First electrode 132 and second electrode 134 may be configured so as to operate differently in different embodiments. In some embodiments, the first electrode 132 and second electrode 134 may provide a driving signal, with the beam 110 and/or proof mass 120 configured to provide a sense signal derived from the displacement of the beam 110 and/or the proof mass 120 relative to the substrate. In some embodiments, the electrodes 132 and 134 may be configured to provide a sensing signal indicating the displacement of the beam 110 and/or proof mass 120 relative to the substrate.

The accelerometer 100 may include sense (or sensing) capacitors. In some embodiments, the beam 110 may form sense capacitors with each of the first electrode 132 and second electrode 134. In the illustrative embodiment of FIGS. 1A and 1B, a first electrode 132 faces the first portion 112 of the beam 110, as a first sense portion, and forms a first sense capacitor. A second electrode 134 faces the proof mass 120 and the second portion 114 of the beam 110, as a second sense portion, and forms a second sense capacitor. The application is not limited in this respect, and each electrode may be arranged facing any portion, or any plurality of portions of the beam 110 and/or may be arranged facing the proof mass 120 in any arrangement of the proof mass to form various sense capacitors. Sense portions of the beam may be configured such that they include a substantially equal sensing area facing the electrodes as described according to the present application.

The capacitance of sense capacitors may be used to measure an acceleration of the beam 110. The capacitance of the first sense capacitor may vary as the distance between the beam 110 and the substrate 130 varies. The capacitance of the second sense capacitor may vary as the distance between the proof mass 120 and the substrate 130 varies. Capacitance of the sense capacitors may vary in response to a displacement of the beam 110. A signal derived from the displacement of the beam 110 may be used to find the acceleration of the accelerometer in the z direction.

The sense capacitors may provide an output signal that indicates a change in capacitance due to pivoting of the beam and/or movement of the proof mass. In some embodiments, the beam may provide a signal which may be used to indicate an acceleration of the accelerometer. The first and second sense capacitors may provide a differential signal. The first sense capacitor may provide a first capacitance and the second sense capacitor may provide a second capacitance. The first capacitance and the second capacitance may provide, and/or may be compared to provide, a differential or pseudo-differential signal. That is to say, as one capacitance increases, the other capacitance may decrease. The second sense capacitor may provide a second capacitance which has a higher amplitude relative to a configuration where there is no proof mass configured to move relative to the beam 120. The second sense capacitor may provide a second capacitance having a higher amplitude than the first capacitance from the first sense capacitor. In at least this respect, capacitances from the first sense capacitor and the second sense capacitor may not be substantially differential relative to each other. That is, an increase in one signal may not correspond to a substantially equal decrease in the other signal and vice-versa. Sense capacitors coupled to portions of the beam arranged further from the first axis 192 may provide signals of greater magnitudes. The capacitances of the first and second sense capacitors may be used to determine an acceleration in the z direction of the accelerometer 100.

The beam 110 may provide a differential or pseudo-differential output signal. In some embodiments, the beam 110 forms an electrode that includes each portion of the beam which facing drive electrodes on the substrate. The anchor 140 of the beam may be electrically coupled to the beam. The anchor 140 may be electrically coupled to a conductive trace or other structure disposed on the substrate 130. The anchor 140 may provide an output signal from the beam 110 to the trace.

In some embodiments, the beam 110 forms an electrode coupled with the first sense capacitor and the second sense capacitor. The anchor 140 may be disposed in a portion of the beam between the first sense capacitor and the second sense capacitor along the x-direction. The anchor 140 may provide a differential signal indicative of the first and second capacitances that are respectively provided by the first and second sense capacitors. The signal may be an output signal indicative of a comparison of the first and second capacitances. The anchor 140 may provide the output signal to the trace disposed on the substrate 130. The trace may provide the signal to a device disposed on the substrate or a device external to the substrate. The device may include circuitry configured to process the output signal to determine an acceleration.

A self-test electrode 136 may be disposed facing a part of the beam 110 not faced by the electrodes 132 and 134. In the illustrative embodiment of FIGS. 1A and 1B, the self-test electrode 136 faces the third portion 116 of the beam 120. The self-test electrode may face any appropriate portion of the beam. The self-test electrode 136 may be used for performing a self-test function of the z-axis accelerometer, but optionally may be omitted.

The accelerometer 100 according to the present application may also include at least one anchor 140. In the illustrative embodiment of FIG. 1C, there is provided one anchor 140. The application is not limited in this respect, and there may be any suitable number of anchors. For example, in some embodiments, there may be two or more anchors, which may be arranged in a line along the first axis 192. The anchor 140 may be coupled to the substrate 130. The anchor 140 may be arranged such that the beam 110 pivots about a first axis 192 which is substantially parallel to the substrate. At least one anchor 140 may be arranged along the first axis 192 such that the beam 110 pivots about the anchor. In the illustrative embodiment of FIG. 1C, the beam surrounds the anchor 140. The application is not limited in this respect, and the anchor 140 may be arranged in any suitable location relative to the beam 110. For example, in a case with two or more anchors, the anchors may be arranged at outer edges of the beam 110. In such a configuration, the anchors may be arranged along the first axis 192, or may not be arranged along the first axis 192. Anchors 140 may be arranged substantially centered relative to edges of the beam 110 in a direction substantially perpendicular to the first axis 192, or may be arranged not substantially centered relative to the edges of the beam in a direction substantially perpendicular to the first axis 192.

The anchor 140 may be coupled to the beam 110 by at least one spring of suitable type, shape, dimension, and orientation. In the illustrative embodiment of FIG. 1C, the anchor 140 is coupled to the beam 110 by two springs 142. In the illustrative embodiment of FIG. 1C, the springs 142 are torsional springs. In some embodiments, the springs 142 may be torsional and/or bending springs. The beam 110 and/or anchor 140 may be considered stiff and/or rigid relative to the springs 142. Springs 142 may be configured of different lengths, cross-sectional areas, and material properties to achieve a desired torsional and/or bending rigidity and/or stiffness.

In some embodiments, the beam 110, the proof mass 120, the substrate 130, the at least one anchor 140 and further components may be formed of a conductor and/or semiconductor material, such as polysilicon, silicon, or a metal conductor. If a semiconductor mater is used the material may be suitably doped to exhibit a desired conductivity. The components may be formed via any suitably fabrication process.

According to aspects of the present application, an electronic system may include an accelerometer according to the foregoing description. The electrodes of an accelerometer according to the present application may be electrically coupled to a circuit board. The circuit board may be electrically coupled to other electronic components. In some embodiments, the accelerometer may be coupled to various external components. For example, the accelerometer may be electrically coupled to a power supply. In some embodiments, the accelerometer may be electrically coupled to a processor which processes signals from the accelerometer. The circuit board may be a printed circuit board. The electronic system may be deployed in various settings to detect accelerations, including sports, healthcare, military, and industrial applications, among others. Some non-limiting examples include sensing environments such as, an automobile or other vehicle, industrial equipment (for example for industrial machine health monitoring), or wearables, such as personal health monitors or fitness trackers.

Such an accelerometer as described according to the foregoing may provide a desirable method of operation for sensing an acceleration in the z direction. The accelerometer may include a substrate, at least one anchor, a beam connected to the substrate by the at least one anchor, and a proof mass configured to move relative to the beam. The beam may pivot about a first axis. The beam may be asymmetric relative to the first axis. The proof mass may be configured to move out of plane of the beam. The proof mass may be configured to pivot and/or translate relative to the beam. The proof mass may be configured to pivot about a second axis other than the first axis. The accelerometer may further include a first electrode and a second electrode, which each may be arranged on the substrate.

The method according to some embodiments comprises sensing an indication of a position of the beam relative to the substrate by at least one sense capacitance, and outputting a signal indicative of the at least one sense capacitance. A driving alternating current signal may be applied by the electrodes to the beam. The output signal may be a differential signal based on a capacitance which varies as the beam pivots.

The method may further include performing at least one operation on at least one of the first output signal and the second output signal to calculate an acceleration in the z-direction applied to the accelerometer. For example, a suitable algorithm may be employed in logic or a processor to calculate an acceleration.

Various aspects and embodiments have been described with respect to the foregoing. However, alternatives may be implemented within the scope of the present application.

First Alternative Configuration

Figure 2:
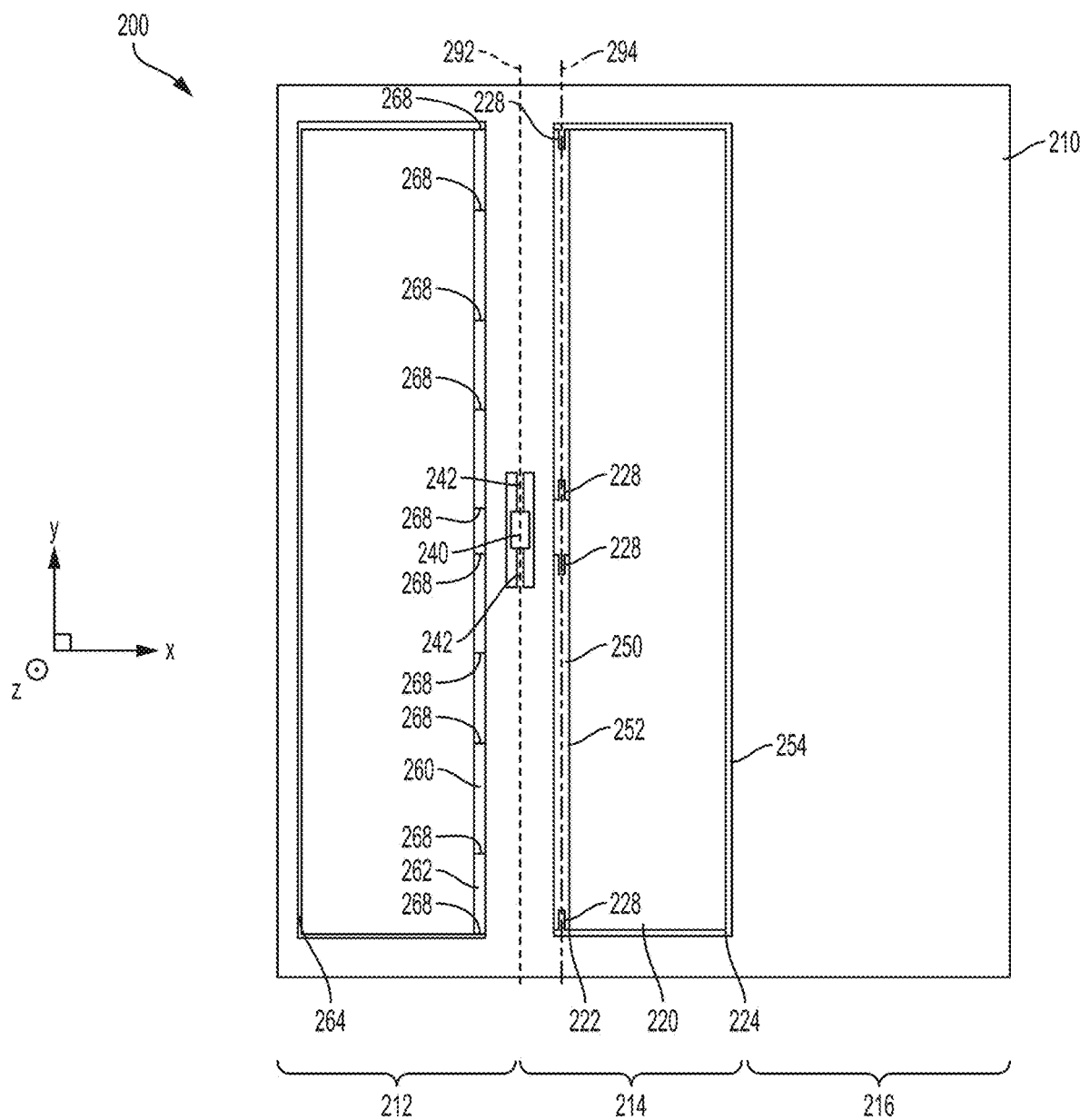
FIG. 2 is a top view of one embodiment of a z-axis accelerometer having a pivoting proof mass.

An alternative configuration of an z-axis accelerometer may be described with respect to FIG. 2. The accelerometer 200 may include a beam 210, a proof mass 220, a substrate 230, and at least one anchor 240. The accelerometer 200 may include a proof mass 220 coupled to the beam 210 by a first side 222 of the proof mass which is proximate a first axis about which the beam pivots.

In at least one aspect, the beam 210 may be configured substantially similarly to the beam 110. The beam 210 may be configured to pivot about a first axis 292. In at least one aspect, the first axis 292 may be configured substantially similarly to first axis 192. The beam 210 may include a first portion 212, second portion 214, and a third portion 216. In at least one aspect, the first portion 212 may be configured substantially similarly to the first portion 112. In at least one aspect, the second portion 214 may be configured substantially similarly to the second portion 114. In at least one aspect, the third portion 216 may be configured substantially similarly to the third portion 116.

In at least one aspect, the proof mass 220 may be configured substantially similarly to the proof mass 120. The proof mass 220 may be configured to pivot about a second axis 294. In at least one aspect, the second axis 294 may be configured substantially similarly to second axis 194. The proof mass 220 may include a first side 222 and a second side 224. In at least one aspect, the first side 222 may be configured substantially similarly to the first side 122. In at least one aspect, the second side 224 may be configured substantially similarly to the second side 124. The proof mass 220 may be coupled to the beam 210 by at least one spring 228, and may be adjacent at least one first opening 250. In at least one aspect, the spring 228 may be configured substantially similarly to the spring 128. In the illustrative embodiment of FIG. 2, the first side 222 of the proof mass 220 is coupled to the beam 210 by the springs 228.

In at least one aspect, the first opening 250 may be configured substantially similarly to the first opening 150. The first opening 250 may have a first side 252 and a second side 254. The first side 252 may be configured substantially similarly to the first side 152. The second side 254 may be configured substantially similarly to the second side 154. In the illustrative embodiment of FIG. 2, the first side 252 of the first opening 250 is wider than the second side 254 of the first opening.

The beam 210 may include a second opening 260 having a first side 262 and a second side 264 and may include a stub 268. The second opening 260 may be configured substantially similarly to the second opening 160. The first side 262 may be configured substantially similarly to the first side 162. The second side 264 may be configured substantially similarly to the second side 164. The stub 268 may be configured substantially similarly to the stub 168. In the illustrative embodiment of FIG. 2, the first side 262 of the second opening 260 is wider than the second side 264 of the second opening.

In at least one aspect, the substrate 230 may be configured substantially similarly to the substrate 230. The substrate 230 may include a first electrode 232, a second electrode 234, and a self-test electrode 236. In at least one aspect, the first electrode 232 may be configured substantially similarly to the first electrode 132. In at least one aspect, the second electrode 234 may be configured substantially similarly to the second electrode 134. In at least one aspect, the self-test electrode 236 may be configured substantially similarly to the self-test electrode 136.

In the illustrative embodiment of FIG. 2, the accelerometer 200 includes one anchor 240. In at least one aspect, the anchor 240 may be configured substantially similarly to the anchor 140. The anchor 240 may be coupled to the beam 210 by a spring 242. In at least one aspect, the spring 242 may be configured substantially similarly to the spring 142.

Second Alternative Configuration

Figure 3:
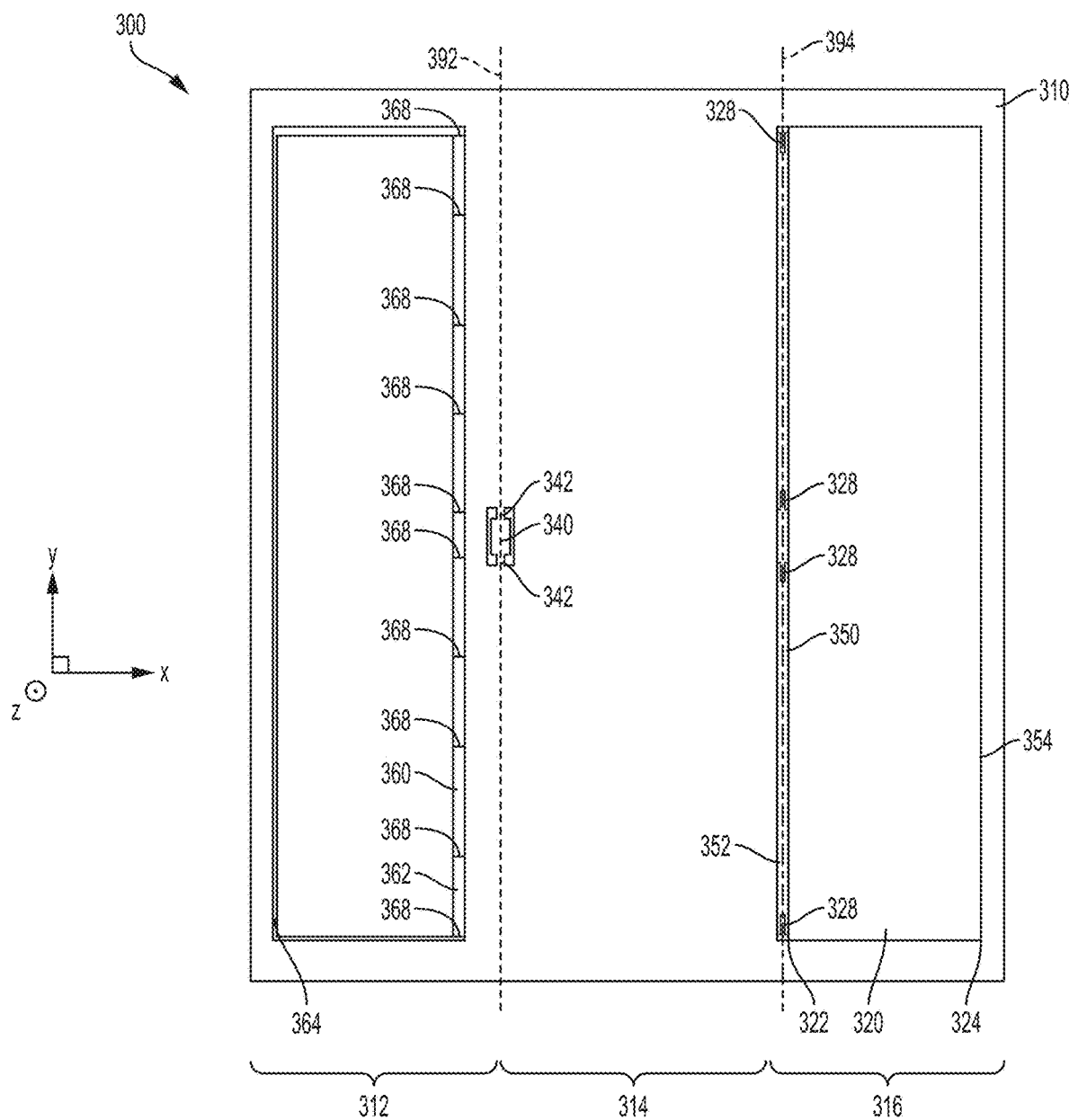
FIG. 3 is a top view of one embodiment of a z-axis accelerometer having a pivoting proof mass.

An alternative configuration of an z-axis accelerometer may be described with respect to FIG. 3. The accelerometer 300 may include a beam 310, a proof mass 320, a substrate 330, and at least one anchor 340. The accelerometer 300 may include a proof mass 320 coupled to a portion of the beam 310 which is not adjacent a first axis about which the beam pivots. Such a configuration may provide a further increased sensitivity of the accelerometer to acceleration in the z direction. The second portion 314 of the beam 310 is between the first axis 392 and the proof mass 320, which may result in the proof mass being disposed at a further distance from the first axis. In various embodiments, the proof mass may be arranged at various distances from the first axis 392.

In at least one aspect, the beam 310 may be configured substantially similarly to the beam 110. The beam 310 may be configured to pivot about a first axis 392. In at least one aspect, the first axis 392 may be configured substantially similarly to first axis 192. The beam 310 may include a first portion 312, second portion 314, and a third portion 316. In at least one aspect, the first portion 312 may be configured substantially similarly to the first portion 112. In at least one aspect, the second portion 314 may be configured substantially similarly to the second portion 114. In at least one aspect, the third portion 316 may be configured substantially similarly to the third portion 116.

In at least one aspect, the proof mass 320 may be configured substantially similarly to the proof mass 120. The proof mass 320 may be configured to pivot about a second axis 394. In at least one aspect, the second axis 394 may be configured substantially similarly to second axis 194. The proof mass 320 may include a first side 322 and a second side 324. In at least one aspect, the first side 322 may be configured substantially similarly to the first side 122. In at least one aspect, the second side 324 may be configured substantially similarly to the second side 124. The proof mass 320 may be coupled to the beam 310 by at least one spring 328, and may be adjacent at least one first opening 350. In at least one aspect, the spring 328 may be configured substantially similarly to the spring 128. In the illustrative embodiment of FIG. 3, the proof mass 320 is arranged in the third portion 316 of the beam 310. In the illustrative embodiment, the first side 322 of the proof mass 320 is coupled to the beam 310 by the springs 328. The application is not limited in this respect, and in some embodiments, other sides of the proof mass 320, for example, the second side 324 of the proof mass, may be coupled to the beam 310 by the springs 328.

In at least one aspect, the first opening 350 may be configured substantially similarly to the first opening 150. The first opening 350 may have a first side 352 and a second side 354. The first side 352 may be configured substantially similarly to the first side 152. The second side 354 may be configured substantially similarly to the second side 154. In the illustrative embodiment of FIG. 3, the first side 352 of the first opening 350 is wider than the second side 354 of the first opening.

The beam 310 may include a second opening 360 having a first side 362 and a second side 364 and may include a stub 368. The second opening 360 may be configured substantially similarly to the second opening 160. The first side 362 may be configured substantially similarly to the first side 162. The second side 364 may be configured substantially similarly to the second side 164. The stub 368 may be configured substantially similarly to the stub 168. In the illustrative embodiment of FIG. 3, the first side 362 of the second opening 360 is wider than the second side 364 of the second opening.

In at least one aspect, the substrate 330 may be configured substantially similarly to the substrate 330. The substrate 330 may include a first electrode 332, a second electrode 334, and a self-test electrode 336. In at least one aspect, the first electrode 332 may be configured substantially similarly to the first electrode 132. In at least one aspect, the second electrode 334 may be configured substantially similarly to the second electrode 134. In at least one aspect, the self-test electrode 336 may be configured substantially similarly to the self-test electrode 136. In the illustrative embodiment of FIG. 3, the second electrode faces the proof mass 320 which is arranged in the third portion 316 of the beam 310, and the self-test electrode faces the second portion 314 of the beam.

In the illustrative embodiment of FIG. 3, the accelerometer 300 includes one anchor 340. In at least one aspect, the anchor 340 may be configured substantially similarly to the anchor 140. The anchor 340 may be coupled to the beam 310 by a spring 342. In at least one aspect, the spring 342 may be configured substantially similarly to the spring 142.

Third Alternative Configuration

Figure 4:
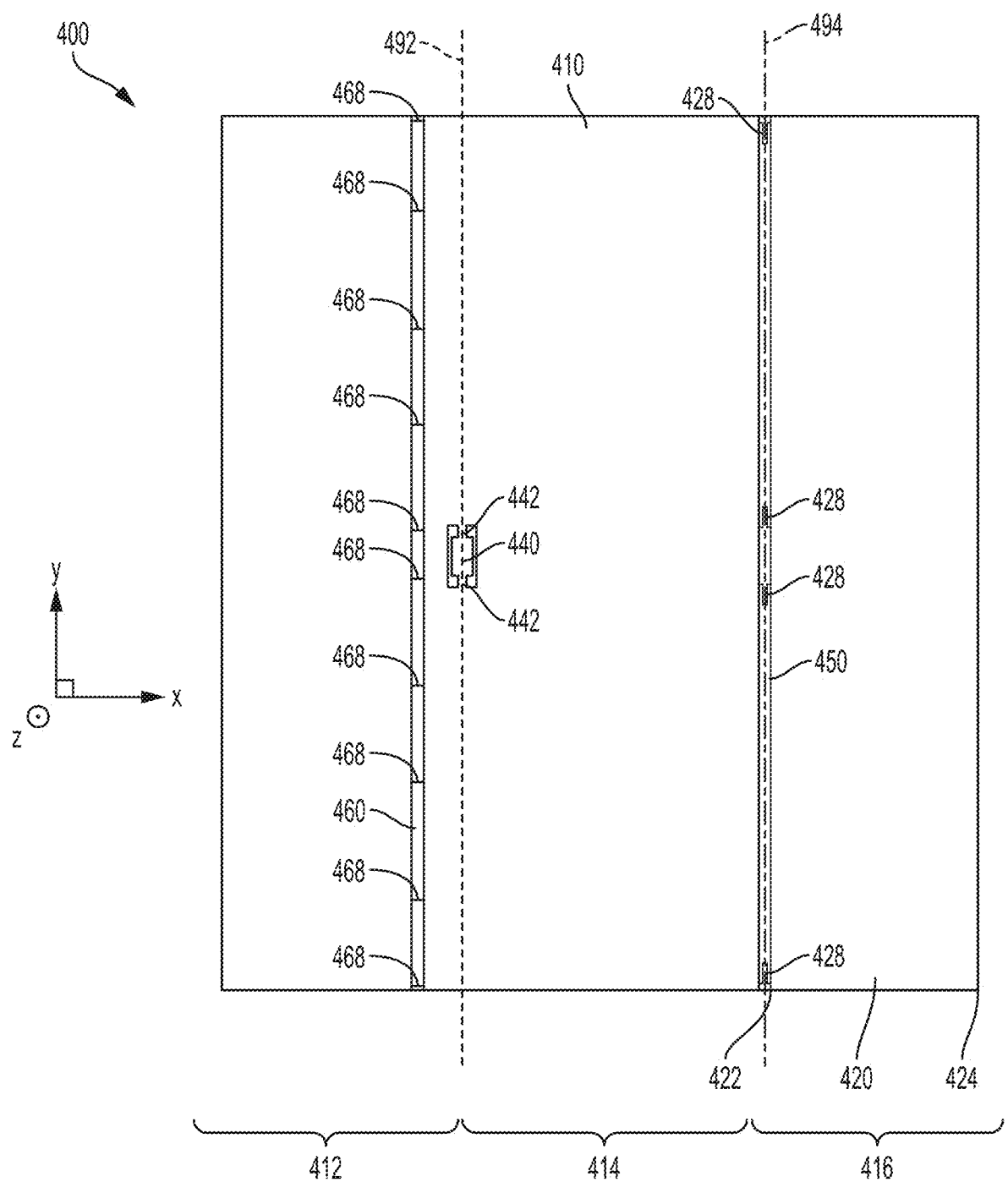
FIG. 4 is a top view of one embodiment of a z-axis accelerometer having a pivoting proof mass.

An alternative configuration of a z-axis accelerometer may be described with respect to FIG. 4. The accelerometer 400 illustrative in FIG. 4. may include a beam 410, a proof mass 420, a substrate 430, and at least one anchor 440. The accelerometer 400 may include a proof mass 420 coupled to an outer edge of the beam 410.

In at least one aspect, the beam 410 may be configured substantially similarly to the beam 110. The beam may be configured to pivot about a first axis 492. In at least one aspect, the first axis 492 may be configured substantially similarly to first axis 192. The beam 410 may include a first portion 412, second portion 414, and a third portion 416. In at least one aspect, the first portion 412 may be configured substantially similarly to the first portion 112. In at least one aspect, the second portion 414 may be configured substantially similarly to the second portion 114. In at least one aspect, the third portion 416 may be configured substantially similarly to the third portion 116.

In at least one aspect, the proof mass 420 may be configured substantially similarly to the proof mass 120. The proof mass 420 may be configured to pivot about a second axis 494. In at least one aspect, the second axis 494 may be configured substantially similarly to second axis 194. The proof mass 420 may include a first side 422 and a second side 424. In at least one aspect, the first side 422 may be configured substantially similarly to the first side 122. In at least one aspect, the second side 424 may be configured substantially similarly to the second side 124. The proof mass 420 may be coupled to the beam 410 by at least one spring 428, and may be adjacent at least one first opening 450. In at least one aspect, the spring 428 may be configured substantially similarly to the spring 128. In the illustrative embodiment of FIG. 4, the proof mass 420 is arranged in the third portion 416 of the beam 410. In the illustrative embodiment, the proof mass is coupled to an outer edge of the beam 410 by the springs 428 and the proof mass is not surrounded by the beam.

In at least one aspect, the first opening 450 may be configured substantially similarly to the first opening 150. The beam 410 may include a second opening 460 and may include a stub 468. The second opening 460 may be configured substantially similarly to the second opening 160. The stub 468 may be configured substantially similarly to the stub 168.

In at least one aspect, the substrate 430 may be configured substantially similarly to the substrate 430. The substrate 430 may include a first electrode 432, a second electrode 434, and a self-test electrode 436. In at least one aspect, the first electrode 432 may be configured substantially similarly to the first electrode 132. In at least one aspect, the second electrode 434 may be configured substantially similarly to the second electrode 134. In at least one aspect, the self-test electrode 436 may be configured substantially similarly to the self-test electrode 136. In the illustrative embodiment of FIG. 4, the second electrode faces the proof mass 420 which is arranged in the third portion 416 of the beam 410, and the self-test electrode faces the second portion 414 of the beam.

In the illustrative embodiment of FIG. 4, the accelerometer 400 includes one anchor 440. In at least one aspect, the anchor 440 may be configured substantially similarly to the anchor 140. The anchor 440 may be coupled to the beam 410 by a spring 442. In at least one aspect, the spring 442 may be configured substantially similarly to the spring 142.

Fourth Alternative Configuration

Figure 5:
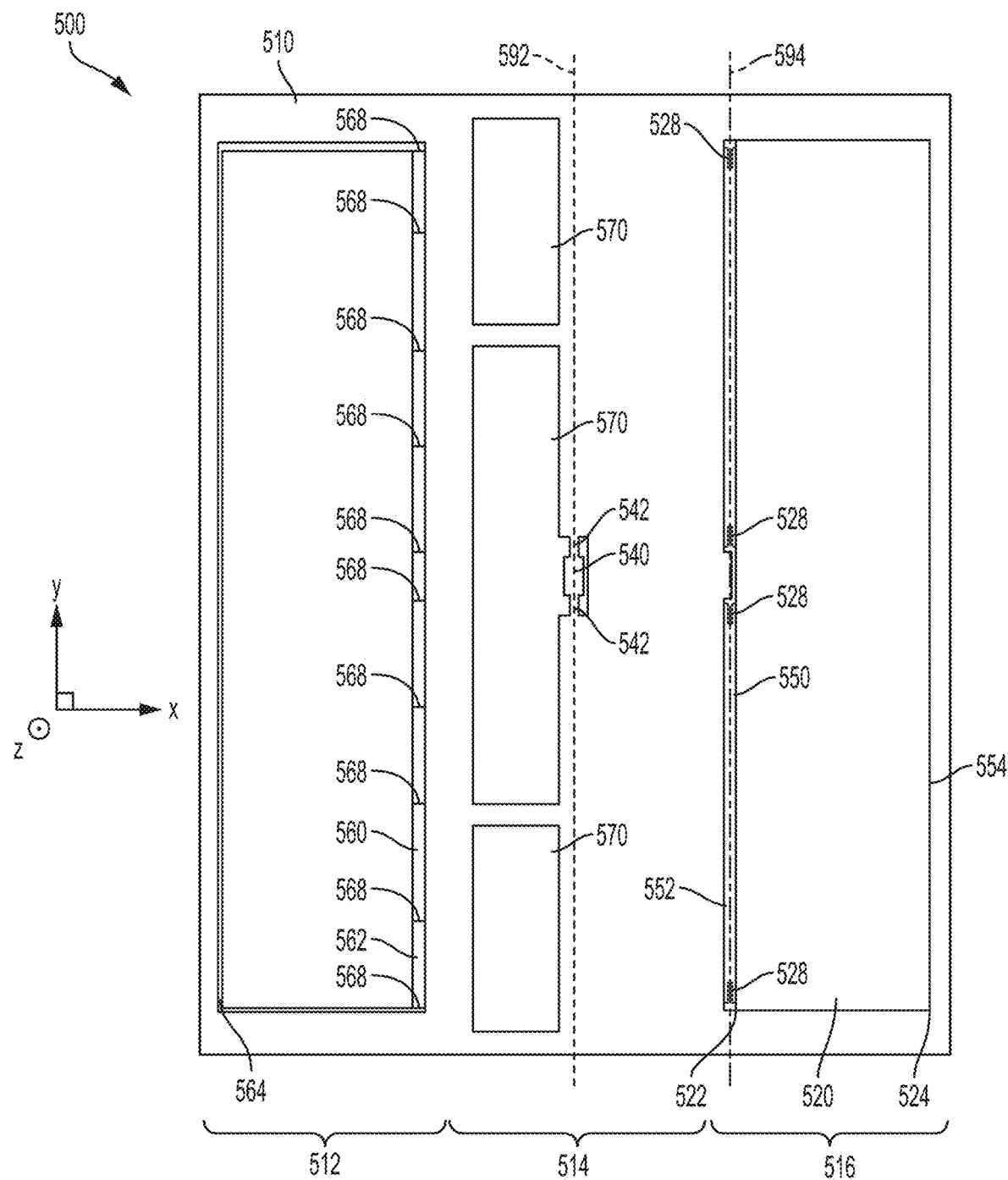
FIG. 5 is a top view of one embodiment of a z-axis accelerometer having a pivoting proof mass.

An alternative configuration of an z-axis accelerometer may be described with respect to FIG. 5. The accelerometer 500 may include a beam 510, a proof mass 520, a substrate 530, and at least one anchor 540. The accelerometer may include a beam 510 centered relative to the anchor 540. The beam 510 may include openings configured to reduce the mass of the beam on one side of a first axis about which the beam pivots.

Aspects of the present application provide at least one anchor centered relative to the beam in a direction perpendicular to a first axis. In some embodiments, there may a third opening in the first portion of the beam configured such that the second portion of the beam has a larger mass than the first portion. In the embodiment, the proof mass may be coupled to either the first portion or the second portion of the beam. A configuration with a centered anchor may provide a offset closer to zero when no acceleration in the z direction is present but may provide a lower sensitivity to acceleration in the z-direction, as compared to a configuration where the anchor is not centered.

In at least one aspect, the beam 510 may be configured substantially similarly to the beam 110. The beam 510 may be configured to pivot about a first axis 592. In at least one aspect, the first axis 592 may be configured substantially similarly to first axis 192. In the illustrative embodiment of FIG. 5, the edges of the beam 510 distal the first axis 592 are substantially centered relative to the first axis in a direction substantially perpendicular to the first axis. The beam 510 may extend a substantially equal distance from the first axis 592 in each of two directions which are each substantially perpendicular to the first axis and in the plane of the beam.

The beam 510 may include a first portion 512, second portion 514, and a third portion 516. In at least one aspect, the first portion 512 may be configured substantially similarly to the first portion 112. In at least one aspect, the second portion 514 may be configured substantially similarly to the second portion 114. The second portion 514 may be bisected by the first axis 592 into a sub portion adjacent the second gap 560 and a sub portion adjacent the first gap 550. In at least one aspect, the third portion 516 may be configured substantially similarly to the third portion 116.

The beam may include one or more structures arranged to configure the mass of the beam 510 on one side of the first axis 592. These structures may configure the beam 510 such that the mass on one side of the first axis 592 is greater than the mass on the other side of the first axis.

The beam 510 may include openings which reduce the mass of the beam on one side of the first axis 592. In the illustrative embodiment of FIG. 5, the second portion of the beam is intersected by the first axis 592. In the illustrative embodiment, the beam 510 includes third openings 570 in the second portion of the beam, on a side of the second portion 514 distal the proof mass. However, the application is not limited in this respect, and in some embodiments, the beam 510 includes third openings 570 in the second portion of the beam, on a side of the second portion proximate the proof mass 520, or in some embodiments, openings 570 in other portions of the beam. The third openings 570 may be configured to reduce the mass of the beam 510 on one side of the first axis 592. In some embodiments the beam 510 may include structures configured to increase the mass of the beam on one side of the first axis 592. Other accelerometers according to the present application may include structures configured to increase and/or decrease the mass of a beam on one side of a first axis about which the beam pivots.

In at least one aspect, the proof mass 520 may be configured substantially similarly to the proof mass 120. The proof mass 520 may be configured to pivot about a second axis 594. In at least one aspect, the second axis 594 may be configured substantially similarly to second axis 194. The proof mass 520 may include a first side 522 and a second side 524. In at least one aspect, the first side 522 may be configured substantially similarly to the first side 122. In at least one aspect, the second side 524 may be configured substantially similarly to the second side 124. The proof mass 520 may be coupled to the beam 510 by at least one spring 528, and may be adjacent at least one first opening 550. In at least one aspect, the spring 528 may be configured substantially similarly to the spring 128. In the illustrative embodiment of FIG. 5, the proof mass 520 is arranged in the third portion 516 of the beam 510. In the illustrative embodiment, the first side 522 of the proof mass 520 is coupled to the beam 510 by the springs 528. However, the application is not limited in this respect, and other sides of the proof mass 520 may be coupled to the beam, for example, the second side 524 of the proof mass may be coupled to the beam 510.

In at least one aspect, the first opening 550 may be configured substantially similarly to the first opening 150. The first opening 550 may have a first side 552 and a second side 554. The first side 552 may be configured substantially similarly to the first side 152. The second side 554 may be configured substantially similarly to the second side 154. In the illustrative embodiment of FIG. 5, the first side 552 of the first opening 550 is wider than the second side 554 of the first opening.

The beam 510 may include a second opening 560 having a first side 562 and a second side 564 and may include a stub 568. The second opening 560 may be configured substantially similarly to the second opening 160. The first side 562 may be configured substantially similarly to the first side 162. The second side 564 may be configured substantially similarly to the second side 164. The stub 568 may be configured substantially similarly to the stub 168. In the illustrative embodiment, the first side 562 of the second opening 560 is wider than the second side 564 of the second opening.

In at least one aspect, the substrate 530 may be configured substantially similarly to the substrate 530. The substrate 530 may include a first electrode 532, a second electrode 534, and a self-test electrode 536. In at least one aspect, the first electrode 532 may be configured substantially similarly to the first electrode 132. In at least one aspect, the second electrode 534 may be configured substantially similarly to the second electrode 134. In at least one aspect, the self-test electrode 536 may be configured substantially similarly to the self-test electrode 136. In the illustrative embodiment of FIG. 5, the second electrode faces the proof mass 520 which is arranged in the third portion 516 of the beam 510, and the self-test electrode faces the second portion 514 of the beam.

In the illustrative embodiment of FIG. 5, the accelerometer 500 includes one anchor 540. In at least one aspect, the anchor 540 may be configured substantially similarly to the anchor 140. The anchor 540 may be coupled to the beam 510 by a spring 542. In at least one aspect, the spring 542 may be configured substantially similarly to the spring 142. In the illustrative embodiment of FIG. 5, the anchor 540 is substantially centered with respect to the outer edges of the beam 510, in the x direction. The first axis 592 is substantially centered with respect to the outer edges of the beam 510, in the x direction. The accelerometer 500 may include two or more anchors 540, which may each be arranged along the first axis 592, and/or which may be centered with respect to the outer edges of the beam 510, in the x direction.

Fifth Alternative Configuration

Figure 6:
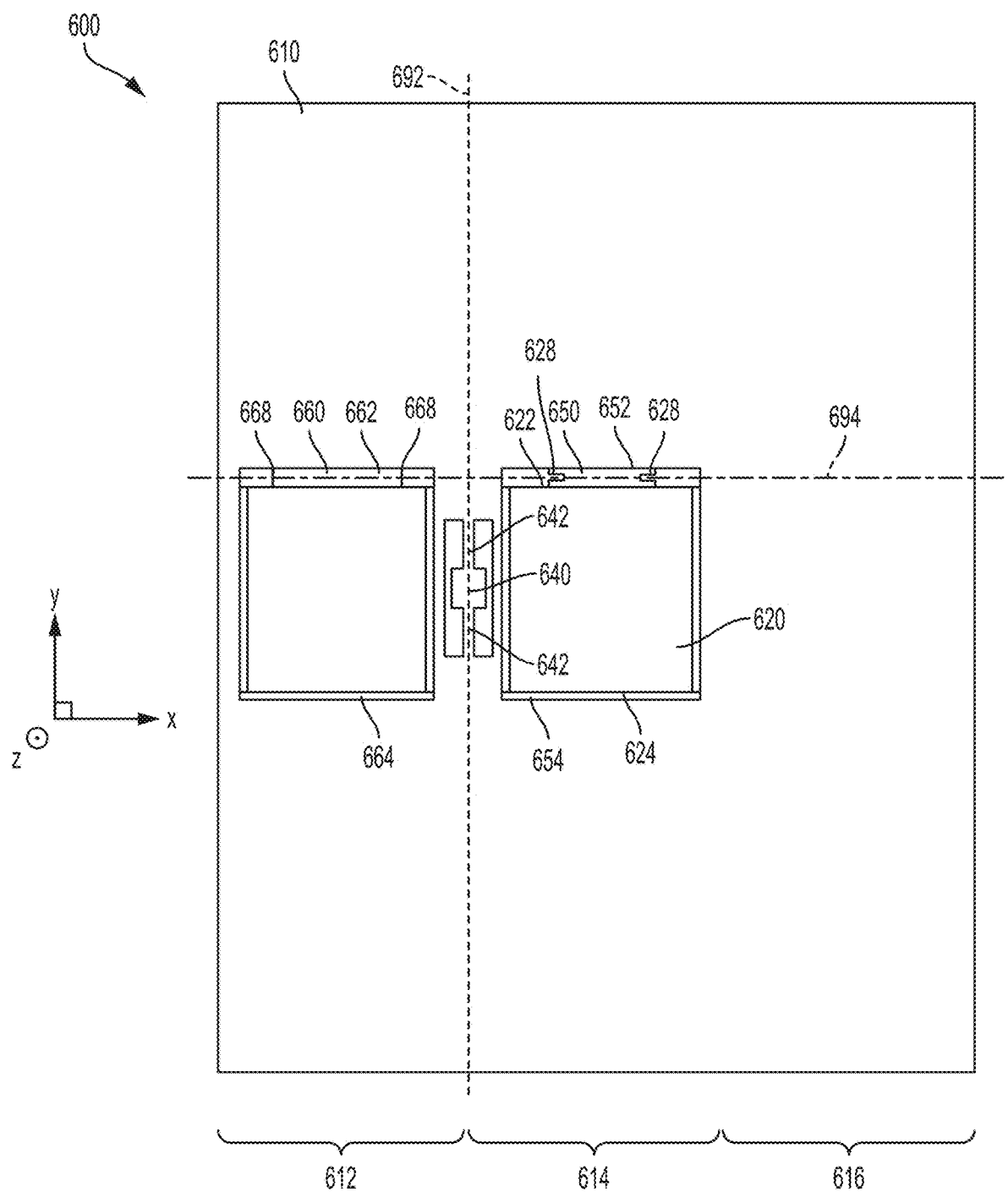
FIG. 6 is a top view of one embodiment of a z-axis accelerometer having a pivoting proof mass.

An alternative configuration of an z-axis accelerometer may be described with respect to FIG. 6. The accelerometer 600 illustrative in FIG. 6. may include a beam 610, a proof mass 620, a substrate 630, and at least one anchor 640. The accelerometer 600 may include a proof mass 620 which pivots about an axis configured at an angle other than parallel to an axis about which the beam 610 pivots.

In at least one aspect, the beam 610 may be configured substantially similarly to the beam 110. The beam 610 may be configured to pivot about a first axis 692. In at least one aspect, the first axis 692 may be configured substantially similarly to first axis 192. The beam 610 may include a first portion 612, second portion 614, and a third portion 616. In at least one aspect, the first portion 612 may be configured substantially similarly to the first portion 112. In at least one aspect, the second portion 614 may be configured substantially similarly to the second portion 114. In at least one aspect, the third portion 616 may be configured substantially similarly to the third portion 116.

In at least one aspect, the proof mass 620 may be configured substantially similarly to the proof mass 120. The proof mass 620 may be configured to pivot about a second axis 694. In at least one aspect, the second axis 694 may be configured substantially similarly to second axis 194. The proof mass 620 may include a first side 622 and a second side 624. In at least one aspect, the first side 622 may be configured substantially similarly to the first side 122. In at least one aspect, the second side 624 may be configured substantially similarly to the second side 124. The proof mass 620 may be coupled to the beam 610 by at least one spring 628, and may be adjacent at least one first opening 650. In at least one aspect, the spring 628 may be configured substantially similarly to the spring 128.

The proof mass 620 may be configured in various arrangements relative to the beam. In the illustrative embodiment of FIG. 6, the proof mass 620 is arranged in the second portion 614 of the beam 610. The proof mass may be arranged in the first or third portions 612 or 616 of the beam. In the illustrative embodiment, the side 622 of the proof mass 620 is coupled to the beam 610 by springs 628. In the illustrative embodiment, the side 622 is substantially perpendicular the first axis 692. The application is not limited in this respect, and a proof mass of any shape may be coupled by any of its sides to the beam. In the illustrative embodiment, the springs 628 are arranged along the second axis 694, which is substantially perpendicular to the first axis 692. The proof mass 620 pivots about the second axis 694 with respect to the beam 610. The second axis 694 may be arranged at any angle to the first axis 692.

The proof mass 620 may be adjacent at least one first opening 650. In at least one aspect, the first opening 650 may be configured substantially similarly to the first opening 150. The first opening 650 may have a first side 652, and a second side 654. The first side 652 may be configured substantially similarly to the first side 152. The second side 654 may be configured substantially similarly to the second side 154. In the illustrative embodiment of FIG. 6, the first opening 650 surrounds the proof mass 620 and is surrounded by the beam 610. In the illustrative embodiment, the opening included a first side 652 adjacent the springs 628 which is wider than a second opening 656 across the proof mass from the springs.

The beam 610 may include a second opening 660 having a first side 662 and a second side 664 and may include a stub 668. The second opening 660 may be configured substantially similarly to the second opening 160. The first side 662 may be configured substantially similarly to the first side 162. The second side 664 may be configured substantially similarly to the second side 164. The stub 668 may be configured substantially similarly to the stub 168. In the illustrative embodiment of FIG. 6, there is a second opening 660 across the first axis 692 from the first opening 650 arranged in the first portion 612 of the beam 610. In the illustrative embodiment, the second opening includes a first side 662 across the first axis 692 from the first side 652 of the first opening 650 which is wider than a second side 664 of the second opening arranged across the first axis 692 from the second side 654 of the first opening. The first side 662 of the second opening 660 may include at least one stub 668 configured to occupy substantially the same area as the springs 628.

In at least one aspect, the substrate 630 may be configured substantially similarly to the substrate 630. The substrate 630 may include a first electrode 632, a second electrode 634, and a self-test electrode 636. In at least one aspect, the first electrode 632 may be configured substantially similarly to the first electrode 132. In at least one aspect, the second electrode 634 may be configured substantially similarly to the second electrode 134. In at least one aspect, the self-test electrode 636 may be configured substantially similarly to the self-test electrode 136.

In the illustrative embodiment of FIG. 6, the accelerometer 600 includes one anchor 640. In at least one aspect, the anchor 640 may be configured substantially similarly to the anchor 140. The anchor 640 may be coupled to the beam 610 by a spring 642. In at least one aspect, the spring 642 may be configured substantially similarly to the spring 142.

Sixth Alternative Configuration

Figure 7:
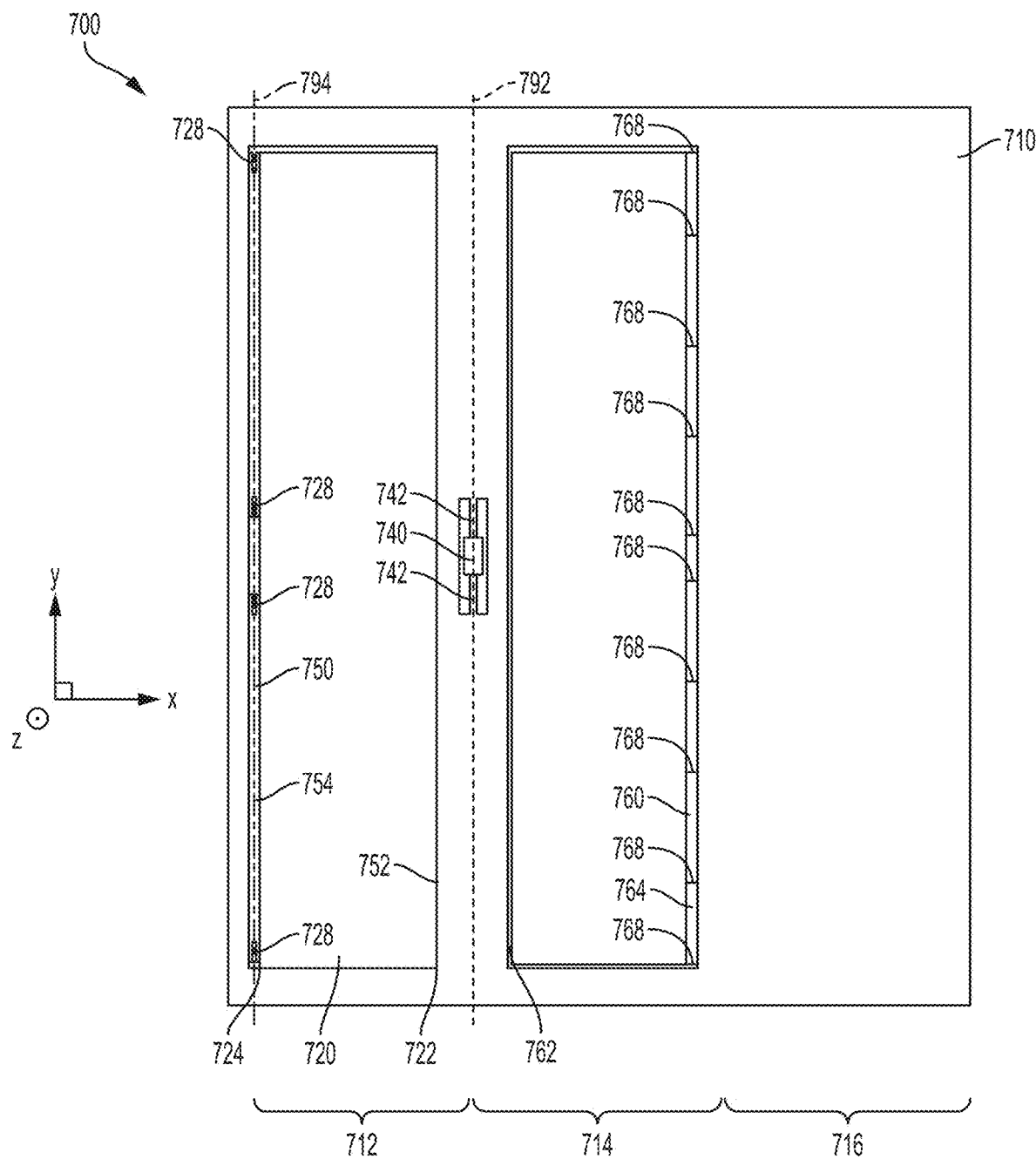
FIG. 7 is a top view of one embodiment of a z-axis accelerometer having a pivoting proof mass.

An alternative configuration of an z-axis accelerometer may be described with respect to FIG. 7. The accelerometer 700 may include a beam 710, a proof mass 720, a substrate 730, and at least one anchor 740. The accelerometer 700 may include a proof mass 720 arranged in a first portion of the beam 710.

In at least one aspect, the beam 710 may be configured substantially similarly to the beam 110. The beam 710 may be configured to pivot about a first axis 792. In at least one aspect, the first axis 792 may be configured substantially similarly to first axis 192. The beam 710 may include a first portion 712, second portion 714, and a third portion 716. In at least one aspect, the first portion 712 may be configured substantially similarly to the first portion 112. In at least one aspect, the second portion 714 may be configured substantially similarly to the second portion 114. In at least one aspect, the third portion 716 may be configured substantially similarly to the third portion 116.

In at least one aspect, the proof mass 720 may be configured substantially similarly to the proof mass 120. The proof mass 720 may be configured to pivot about a second axis 794. In at least one aspect, the second axis 794 may be configured substantially similarly to second axis 194. The proof mass 720 may include a first side 722 and a second side 724. In at least one aspect, the first side 722 may be configured substantially similarly to the first side 122. In at least one aspect, the second side 724 may be configured substantially similarly to the second side 124. The proof mass 720 may be coupled to the beam 710 by at least one spring 728, and may be adjacent at least one first opening 750. In at least one aspect, the spring 728 may be configured substantially similarly to the spring 128. In the illustrative embodiment of FIG. 7, the proof mass 720 is arranged in the first portion 716 of the beam 710. In the illustrative embodiment, the second side 724 of the proof mass 720 is coupled to the beam 710 by the springs 728. The first side 722 of the proof mass 720 may alternatively be coupled to the beam 710.

In at least one aspect, the first opening 750 may be configured substantially similarly to the first opening 150. The first opening 750 may have a first side 752 and a second side 754. The first side 752 may be configured substantially similarly to the first side 152. The second side 754 may be configured substantially similarly to the second side 154. In the illustrative embodiment of FIG. 7, the second side 754 of the first opening 750 is wider than the first side 752 of the first opening.

The beam 710 may include a second opening 760 having a first side 762 and a second side 764 and may include a stub 768. The second opening 760 may be configured substantially similarly to the second opening 160. The first side 762 may be configured substantially similarly to the first side 162. The second side 764 may be configured substantially similarly to the second side 164. The stub 768 may be configured substantially similarly to the stub 168. In the illustrative embodiment of FIG. 7, the second opening 760 is arranged in the second portion 714 of the beam 710. In the illustrative embodiment, the second side 764 of the second opening 760 is wider than the first side 762 of the second opening.

In at least one aspect, the substrate 730 may be configured substantially similarly to the substrate 730. The substrate 730 may include a first electrode 732, a second electrode 734, and a self-test electrode 736. In at least one aspect, the first electrode 732 may be configured substantially similarly to the first electrode 132. In at least one aspect, the second electrode 734 may be configured substantially similarly to the second electrode 134. In at least one aspect, the self-test electrode 736 may be configured substantially similarly to the self-test electrode 136. In the illustrative embodiment of FIG. 7, the first electrode faces the second portion 714 of the beam 710. The second electrode faces the proof mass 720 which is arranged in the first portion 712 of the beam 710, and the self-test electrode faces the third portion 716 of the beam. In some embodiments, the first electrode may face the third portion of the beam and the self-test electrode may face the second portion of the beam.

In the illustrative embodiment of FIG. 7, the accelerometer 700 includes one anchor 740. In at least one aspect, the anchor 740 may be configured substantially similarly to the anchor 140. The anchor 740 may be coupled to the beam 710 by a spring 742. In at least one aspect, the spring 742 may be configured substantially similarly to the spring 142.

Seventh Alternative Configuration

Figure 8A:
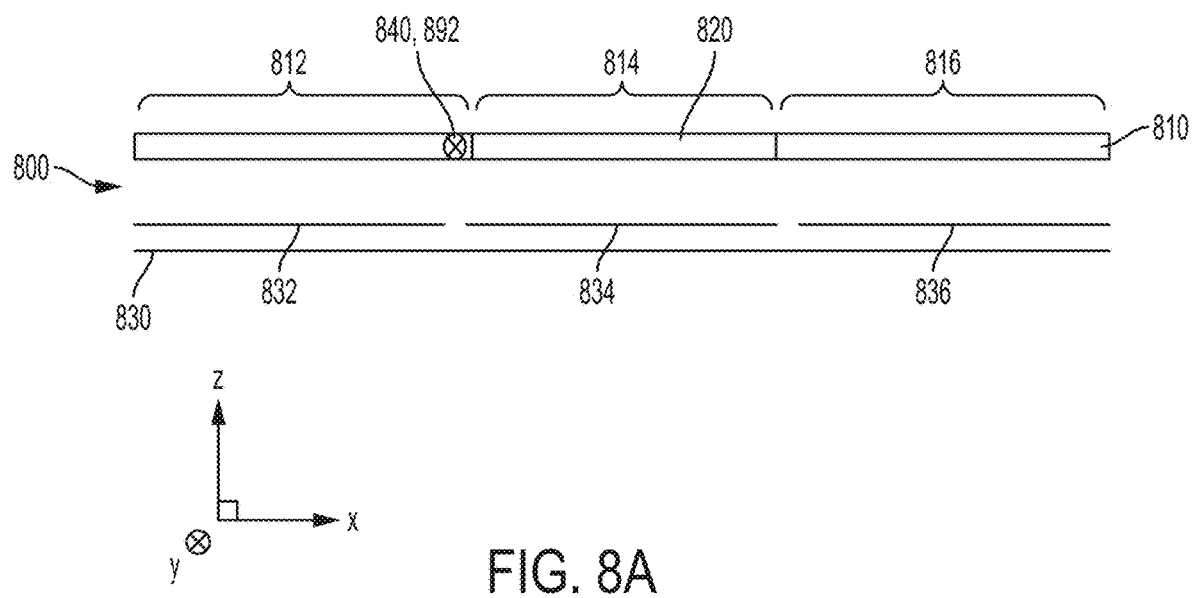
FIG. 8A is a side view of one embodiment of a z-axis accelerometer having a translating proof mass.
Figure 8B:
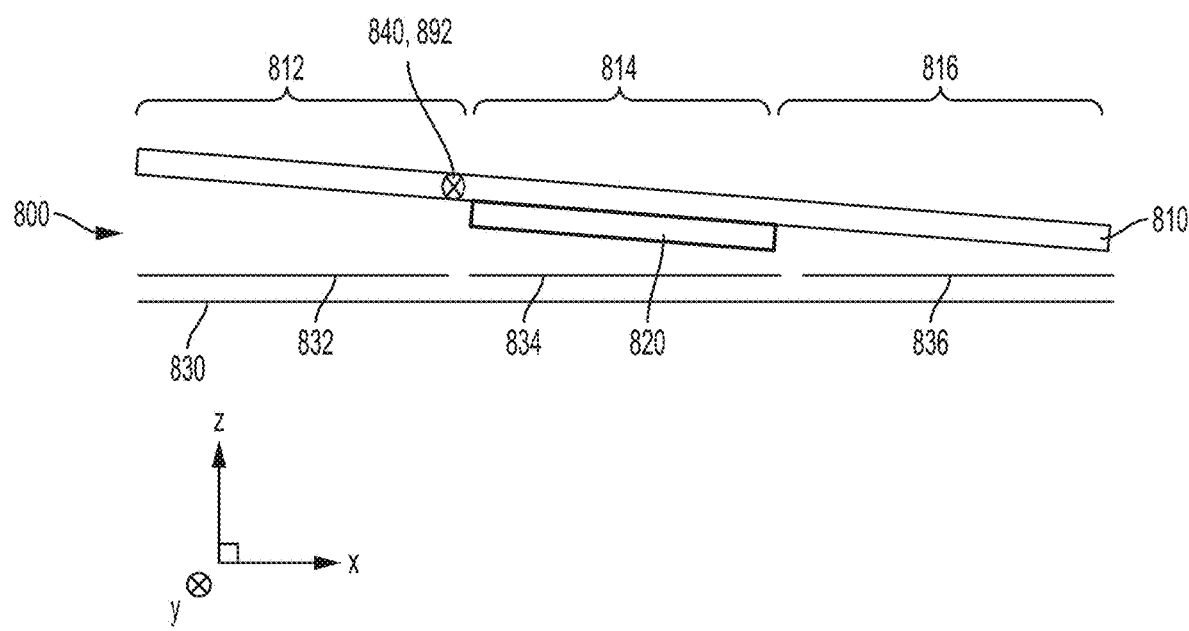
FIG. 8B is a side view of one embodiment of a z-axis accelerometer having a translating proof mass.
Figure 8C:
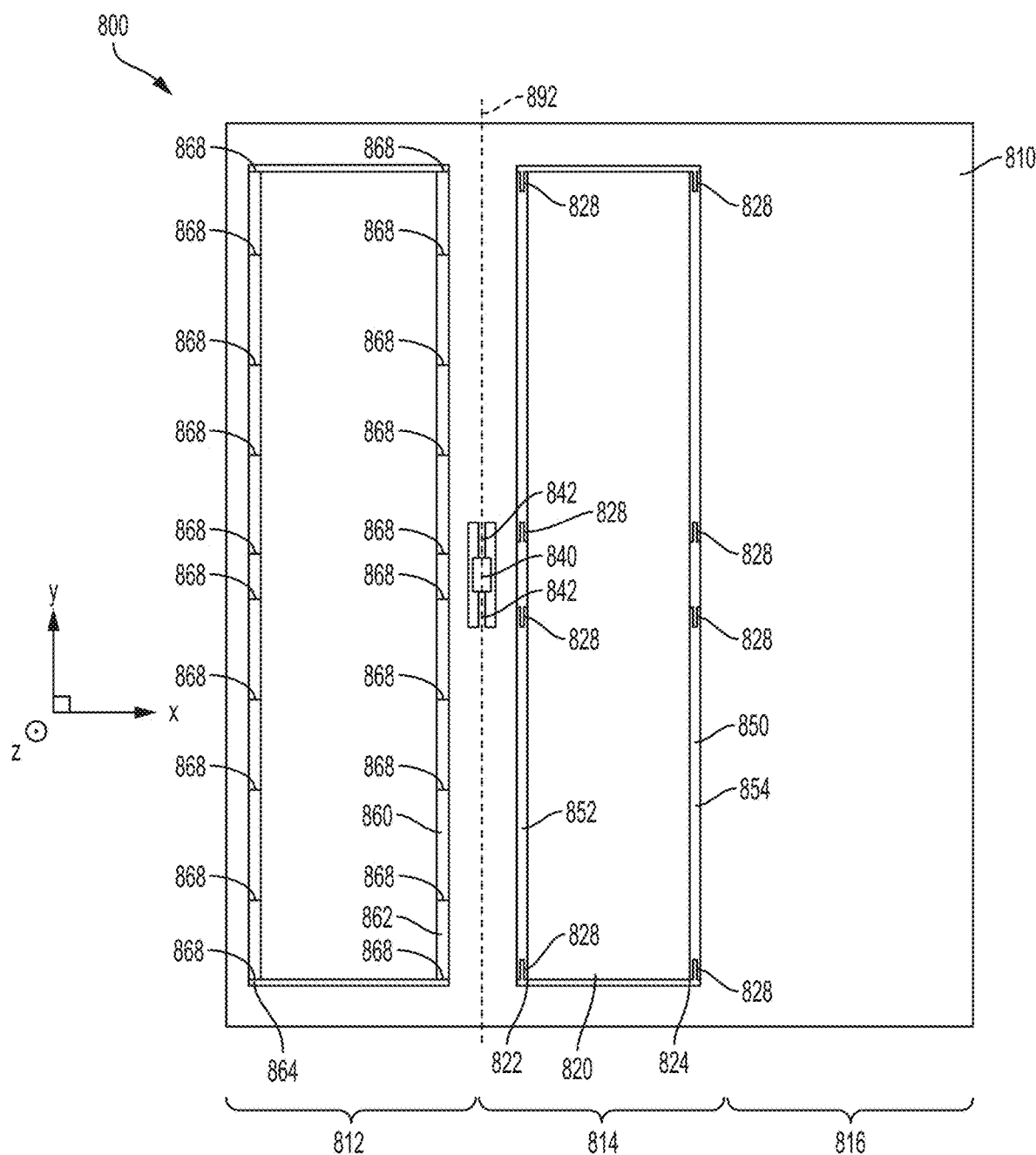
FIG. 8C is a top view of one embodiment of a z-axis accelerometer having a translating proof mass.

An alternative configuration of an z-axis accelerometer may be described with respect to FIGS. 8A-8C. The accelerometer 800 illustrative in FIGS. 8A-8C. may include a beam 810, a proof mass 820, a substrate 830, and at least one anchor 840. The accelerometer 800 may include a proof mass 820 configured to translate relative to a pivoting plane of the beam 810.

FIG. 8A shows an illustration of an accelerometer 800 according to an embodiment of the present application when an acceleration of 0 g in the z direction is applied. FIG. 8B shows an illustration of an accelerometer 100 according to an embodiment of the present application when an acceleration with a magnitude greater than 0 g in the z direction is applied. The illustration shows the proof mass 820 translating out of plan with respect to the beam 810. In some embodiments, the proof mass 820 may translate vertically out of plane with the plane of the beam. However, the application is not limited in this respect, and the proof mass 820 may pivot and/or translate with respect to the beam.

As shown in FIG. 8C, in at least one aspect, the beam 810 may be configured substantially similarly to the beam 110. The beam 810 may be configured to pivot about a first axis 892. In at least one aspect, the first axis 892 may be configured substantially similarly to first axis 192. The beam 810 may include a first portion 812, second portion 814, and a third portion 816. In at least one aspect, the first portion 812 may be configured substantially similarly to the first portion 112. In at least one aspect, the second portion 814 may be configured substantially similarly to the second portion 114. In at least one aspect, the third portion 816 may be configured substantially similarly to the third portion 116.

In at least one aspect, the proof mass 820 may be configured substantially similarly to the proof mass 120. The proof mass 820 may include a first side 822 and a second side 824. In at least one aspect, the first side 822 may be configured substantially similarly to the first side 122. In at least one aspect, the second side 824 may be configured substantially similarly to the second side 124. The proof mass 820 may be coupled to the beam 810 by at least one spring 828, and may be adjacent at least one first opening 850. In at least one aspect, the spring 828 may be configured substantially similarly to the spring 128. In the illustrative embodiment of FIG. 8C, the first side 822 of the proof mass 820 is coupled to the beam by four springs 828, and the second side 824 is coupled to the beam by fours springs 828. In the illustrative embodiment of FIG. 8C, the springs 828 are bending springs. However, the present application is not limited any number of springs, or to bending springs, and any number of type of springs may be coupled to the proof mass 820. The bending springs may be configured such that the proof mass 820 translates and/or pivots out of a pivoting plane of the beam 810 in response to a acceleration in the z direction. The proof mass 820 may have a higher amplitude than a beam not having a proof mass.

In at least one aspect, the first opening 850 may be configured substantially similarly to the first opening 150. The first opening 850 may have a first side 852 and a second side 854. The first side 852 may be configured substantially similarly to the first side 152. The second side 854 may be configured substantially similarly to the second side 154. In the illustrative embodiment of FIG. 8C, the first side 852 and the second side 854 have substantially equal widths.

The beam 810 may include a second opening 860 having a first side 862 and a second side 864 and may include a stub 868. The second opening 460 may be configured substantially similarly to the second opening 160. The first side 862 may be configured substantially similarly to the first side 162. The second side 864 may be configured substantially similarly to the second side 164. The stub 868 may be configured substantially similarly to the stub 168. In the illustrative embodiment of FIG. 8C, the first side 862 and the second side 864 have a substantially equal width.

In at least one aspect, the substrate 830 may be configured substantially similarly to the substrate 830. The substrate 830 may include a first electrode 832, a second electrode 834, and a self-test electrode 836. In at least one aspect, the first electrode 832 may be configured substantially similarly to the first electrode 132. In at least one aspect, the second electrode 834 may be configured substantially similarly to the second electrode 134. In at least one aspect, the self-test electrode 836 may be configured substantially similarly to the self-test electrode 136.

In the illustrative embodiment of FIG. 8C, the accelerometer 800 includes one anchor 840. In at least one aspect, the anchor 840 may be configured substantially similarly to the anchor 140. The anchor 840 may be coupled to the beam 810 by a spring 842. In at least one aspect, the spring 842 may be configured substantially similarly to the spring 142.

It should also be appreciated that while the present disclosure describes various configurations of single axis accelerometers, two or more accelerometers according to the present disclosure may be used in conjunction to sense accelerations about two or more axes in the same device. In some embodiments, two or more accelerometers may sense accelerations about two or more perpendicular axes and may sense two or more accelerations simultaneously.

Some applications of some embodiments of the present application include low or high acceleration environments including, but not limited to, automotive, wearables, and machine health monitoring.

Figure 9:
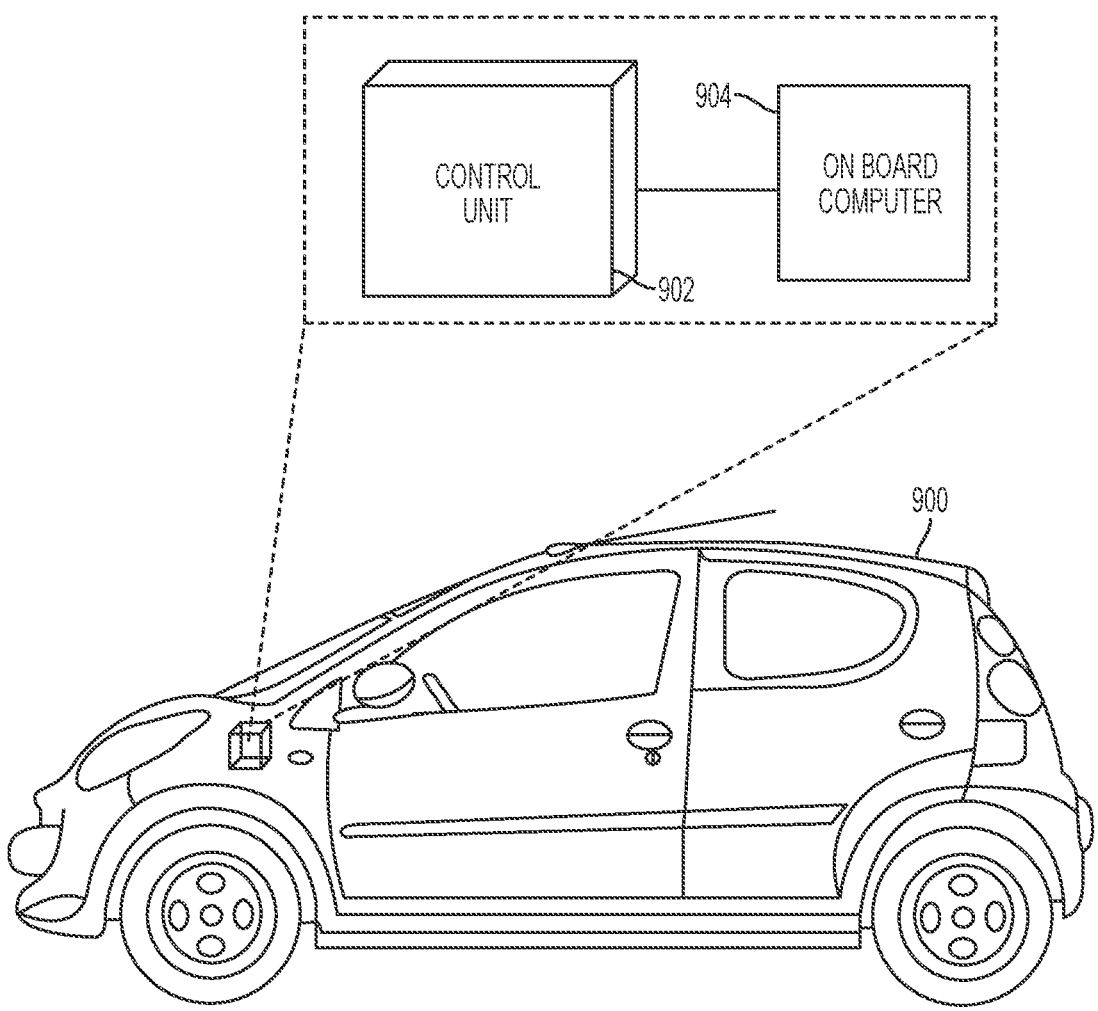
FIG. 9 illustrates an automobile which may include a z-axis accelerometer of one of the types described herein, according to a non-limiting embodiment of the present application.

FIG. 9 illustrates a non-limiting example in which at least one accelerometer of the types described herein is employed in a car. In the example of FIG. 9, an automobile 900 includes a control unit 902 coupled to an onboard computer 904 of the car by a wired or wireless connection. Control unit 902 may include at least one accelerometer of the types described herein. As a non-limiting example, the at least one accelerometer may sense accelerations in the driving direction and/or perpendicular to the driving direction. The at least one accelerometer may also be configured to sense vertical accelerations, which may be useful to monitor the status of a suspension of the automobile 900, for example. The control unit 902 may receive power and control signals from the onboard computer 904, and may supply output signals of the type described herein to the onboard computer 904.

Figure 10:
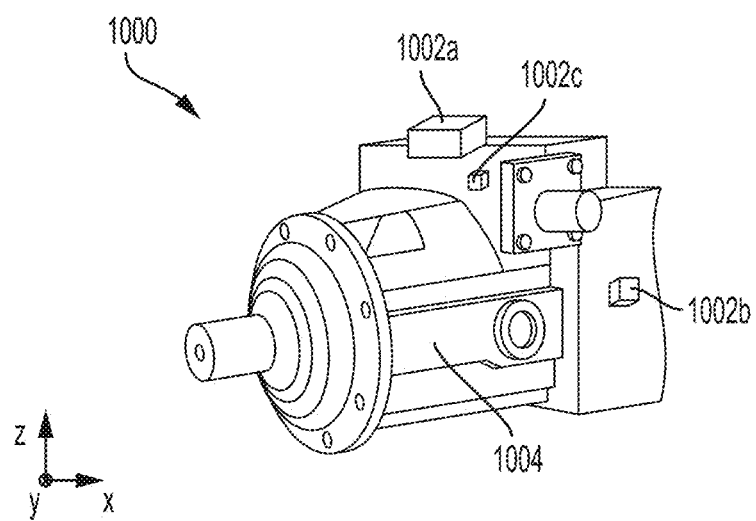
FIG. 10 illustrates a piece of industrial equipment on which are disposed three z-axis accelerometers of the types described herein, according to a non-limiting embodiment of the present application.

FIG. 10 illustrates a system 1000 including three z-axis MEMS accelerometers 1002a, 1002b, and 1002c of one or more of the types described herein coupled to a piece of industrial equipment 1004. The equipment 1004 may be a motor, although this is a non-limiting example. The accelerometers 1002a-1002c may be coupled to the equipment and configured to monitor vibration of the equipment with respect to a respective axis. For example, accelerometer 1002a may be oriented to detect z-axis acceleration, accelerometer 1002b y-axis acceleration, and accelerometer 1002c x-axis acceleration. In an alternative embodiment, two or more of the accelerometers 1002a-1002c may be combined into a single package or housing, as opposed to the illustrated configuration of three distinct housings. The system may wirelessly communicate acceleration data generated by the respective accelerometer. Energy to power the accelerometer circuitry may be harvested from the vibration of the equipment 1004. Other configurations are possible.

Various aspects of the present application may provide one or more benefits. Some examples are now listed. It should be appreciated that not all aspects necessarily provide all benefits, and benefits other than those listed may be provided by one or more aspects. According to some aspects of the present application, increased sensitivity of z-axis teeter-totter accelerometers is provided. The increased sensitivity may be particularly noticeable or beneficial at high operating frequencies. For example, teeter-totter accelerometers operating at frequencies between 2 kHz and 100 kHz (or any value within that range, as a non-limiting example) may exhibit increased sensitivity compared to conventional designs.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The terms "approximately," "substantially," and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

What is claimed is:

1. A z-axis teeter-totter accelerometer, comprising:
   a substrate;
   an anchor;
   a beam connected to the substrate by the anchor and configured to pivot about a first axis, the first axis parallel to the substrate, wherein the beam is asymmetric relative to the first axis; and
   a proof mass coupled to the beam and configured to pivot relative to the beam, about a second axis different than the first axis, wherein the proof mass is coupled to the beam at one side and wherein the second axis is parallel to the one side and fixed in-plane with the beam.

2. The accelerometer of claim 1, wherein the proof mass comprises a first side proximate the first axis and a second side distal the first axis, and the one side of the proof mass coupled to the beam is the first side.

3. The accelerometer of claim 1, wherein the proof mass comprises a first side proximate the first axis and a second side distal the first axis, and the one side of the proof mass coupled to the beam is the second side.

4. The accelerometer of claim 1, wherein the beam further comprises:
   a spring coupled to the beam and the proof mass;
   a plurality of stubs positioned on an opposite side of the first axis from the spring;
   wherein the stubs are configured to occupy substantially a same amount of area of the beam as the spring.

5. The accelerometer of claim 1 wherein the anchor is centered relative to the beam in a direction perpendicular to the first axis.

6. The accelerometer of claim 1, wherein the beam comprises a first portion and a second portion separated by the first axis, the second portion having greater mass than the first portion, wherein the proof mass is coupled to the first portion of the beam.

7. The accelerometer of claim 1, wherein the beam comprises a first portion and a second portion separated by the first axis, the second portion having greater mass than the first portion, wherein the proof mass is coupled to the second portion of the beam.

8. The accelerometer of claim 1, further comprising circuitry disposed on the substrate and configured to sense a capacitance between the substrate and the proof mass.

9. The accelerometer of claim 1, further comprising an electrode disposed on the substrate, wherein the proof mass is configured to be spaced from the electrode by a shorter distance than the beam upon pivoting of the proof mass toward the electrode.

10. The accelerometer of claim 1, wherein the second axis is substantially parallel to the first axis.

11. A method of operating a z-axis accelerometer, the accelerometer comprising a substrate, an anchor, a beam connected to the substrate by the anchor, and a proof mass coupled to the beam, the method comprising:
   sensing an indication of a position of a first portion of the beam relative to the substrate using a first sense capacitance,
   sensing an indication of a position of the proof mass relative to the substrate using a second sense capacitance, the proof mass being coupled to a second portion of the beam, and outputting a signal indicative of the first sense capacitance and the second sense capacitance, wherein:

the beam is configured to pivot about a first axis, the first axis parallel to the substrate;

the proof mass is configured to pivot relative to the beam, about a second axis other than the first axis and parallel to the substrate;

the first sense capacitance has a first amplitude;

the second sense capacitance has a second amplitude greater than the first amplitude; and outputting a signal comprises outputting a differential of the first and second capacitances.

12. The method of claim 11, further comprising pivoting the proof mass relative to the beam by moving a free side of the proof mass positioned between the first axis and a connection point of the proof mass to the beam.

13. The method of claim 11, further comprising pivoting the proof mass relative to the beam by moving a free side of the proof mass separated from the first axis by a connection point of the proof mass to the beam.

14. The method of claim 11, wherein the proof mass is a first proof mass, and wherein the z-axis accelerometer comprises a second proof mass configured to pivot relative to the beam, wherein the method further comprises sensing a position of the second proof mass relative to the substrate.

15. A z-axis accelerometer, comprising:

a substrate;

an anchor;

a beam connected to the substrate by the anchor and configured to pivot about a first axis, the first axis parallel to the substrate;

a proof mass embedded in the beam and configured to translate vertically out-of-plane relative to a pivoting plane of the beam; and circuitry disposed on the substrate and configured to sense a first capacitance of a first capacitor formed by the substrate and the beam and a second capacitance of a second capacitor formed by the substrate and the proof mass.

16. The z-axis accelerometer of claim 15, wherein the beam has an asymmetric mass relative to the first axis, including a first mass portion on a first side of the first axis and a second mass portion on a second side of the first axis, the first mass portion greater than the second mass portion, and wherein the proof mass is embedded in the first mass portion.

17. The z-axis accelerometer of claim 15, wherein the beam has an asymmetric mass relative to the first axis, including a first mass portion on a first side of the first axis and a second mass portion on a second side of the first axis, the first mass portion greater than the second mass portion, and wherein the proof mass is embedded in the second mass portion.

18. The z-axis accelerometer of claim 15, further comprising additional circuitry configured to process at least one signal representing the first and second capacitances.

19. The z-axis accelerometer of claim 15, wherein the beam is asymmetric with respect to the first axis, and wherein the proof mass is embedded in the beam on one side of the first axis.

* * * * *